(12) United States Patent
Everest

(10) Patent No.: US 8,095,583 B1
(45) Date of Patent: Jan. 10, 2012

(54) CHAOTIC AND FRACTAL FIELD LINE CALCULATIONS USING DECOMPOSITION AND SELF WINDING

(76) Inventor: Michael T. Everest, Sunnyvale, CA (US)

( * ) Notice: Subject to any disclaimer, the term of this patent is extended or adjusted under 35 U.S.C. 154(b) by 1165 days.

(21) Appl. No.: 11/757,858

(22) Filed: Jun. 4, 2007

(51) Int. Cl.
G06F 15/00 (2006.01)
G09G 5/00 (2006.01)

(52) U.S. Cl. .......... 708/200; 345/581
(58) Field of Classification Search .......... 708/200
See application file for complete search history.

(56) References Cited

U.S. PATENT DOCUMENTS

| | | | | |
|---|---|---|---|---|
| 2002/0183960 A1* | 12/2002 | Chiou et al. | .......... | 702/150 |
| 2007/0040848 A1* | 2/2007 | Hutchinson et al. | .......... | 345/629 |
| 2007/0053595 A1* | 3/2007 | Eswara | .......... | 382/233 |
| 2010/0332572 A1 | 12/2010 | Everest | | |
| 2011/0004648 A1 | 1/2011 | Everest | | |
| 2011/0082894 A1 | 4/2011 | Everest | | |
| 2011/0082895 A1 | 4/2011 | Everest | | |

OTHER PUBLICATIONS

U.S. Appl. No. 11,336,187, filed Jan. 19, 2006, Restriction Requirement, Mailed Mar. 26, 2010.
U.S. Appl. No. 11,336,166, filed Jan. 19, 2006, Restriction Requirement, Mailed Mar. 23, 2010.
U.S. Appl. No. 11,336,187, filed Jan. 19, 2006, Notice of Allowance, Mailed May 14, 2010.
Philip, K., "Field lines in the Mandelbrot set" downloaded from the Internet Jul. 19, 2007 < http://www.sciencedirect.com/science?_ob=ArticleURL&_udi=B6TYG-48TMXNC-14N... > 1 page, Abstract.

* cited by examiner

*Primary Examiner* — Chuong D Ngo
(74) *Attorney, Agent, or Firm* — Hickman Palermo Truong & Becker LLP

(57) ABSTRACT

Faster methods for topological categorization and field line calculations are developed by using decomposition regions together with the self-winding techniques first developed in a prior patent application. A point iteration technique provides direct calculation of low order digits of winding counts without use of complex intervals. Easy to calculate derivatives define decomposition interval boundaries which substitute for methods using the slower complex interval processing of the prior patent. Methods common to this and the prior patent are developed for visualizing conformal mappings of iterated functions.

4 Claims, 42 Drawing Sheets

Prior Art

FIG.2

| Operator | | Special Form | Number System | Branchcut |
|---|---|---|---|---|

Non Intrinsic Operators:
| | | | | |
|---|---|---|---|---|
| 050 | inclusive metacomplex scalar | | Metacomplex | |
| 052 | inclusive rigid body rotation | stable point multiplication for | Hypercomplex | |
| 054 | inclusive invert operator | unitized metacomplex form | Metacomplex | |
| 056 | unit power operator | | Metacomplex | |
| 058 | zero power operator | | Metacomplex | |

Direct Intrinsic Operators:
| | | | | |
|---|---|---|---|---|
| 060 | optimal inclusive additive operator | | Metacomplex | |
| 062 | inclusive metacomplex shape converter | | Metacomplex | |

Unitizing Range Operators:
| | | | | |
|---|---|---|---|---|
| 064 | inclusive metacomplex range | unitized metacomplex form | Metacomplex | |

Multiplication Operators:
all should use: (stable point multiplication, form and unitized metacomplex form)
| | | | | |
|---|---|---|---|---|
| 066 | stable inclusive complex multiplication | stable Krier real root form | Complex | |
| 068 | stable inclusive quaternion multiplication | stable Krier real root form | Quaternion | |
| 070 | cubic inclusive quaternion multiplication | | Quaternion | |

Contractive Power Operators: (all:unitized metacomplex form)
| | | | | |
|---|---|---|---|---|
| 072 | inclusive complex contraction power | unitized contraction power form | Complex | Yes |
| 074 | inclusive hypercomplex contraction power | unitized contraction power form | Hypercomplex | Yes |
| 076 | stable inclusive complex square root | radius square root form | Complex | Yes |
| 078 | stable inclusive hypercomplex square root | radius square root form | Hypercomplex | Yes |

Non-Linear Unitizing Expansion Power Operators:
(all:unitized metacomplex form, robust expansion nonlinear search form, expansion search limit forms)
| | | | | |
|---|---|---|---|---|
| 080 | inclusive robust complex expansion power | | Complex | maybe |
| 082 | inclusive hypercomplex expansion power | | Hypercomplex | maybe |

Stable Explicit Power >1 Operators: (all:unitized metacomplex form)
| | | | | |
|---|---|---|---|---|
| 084 | stable inclusive complex square power | optimal inclusive squaring form | Complex | |
| 086 | stable inclusive hypercomplex square power | optimal inclusive squaring form | HyperComplex | |
| 088 | stable inclusive metacomplex three halves power | three halves power form | Complex | Yes |

FIG.18   Enumeration of Decomposition Regions

FIG.19 Modulo Banding Creator Embodiment

Winding Digit Adjustment Calculator Embodiment

FIG.21   Full Modulo Iterator Embodiment
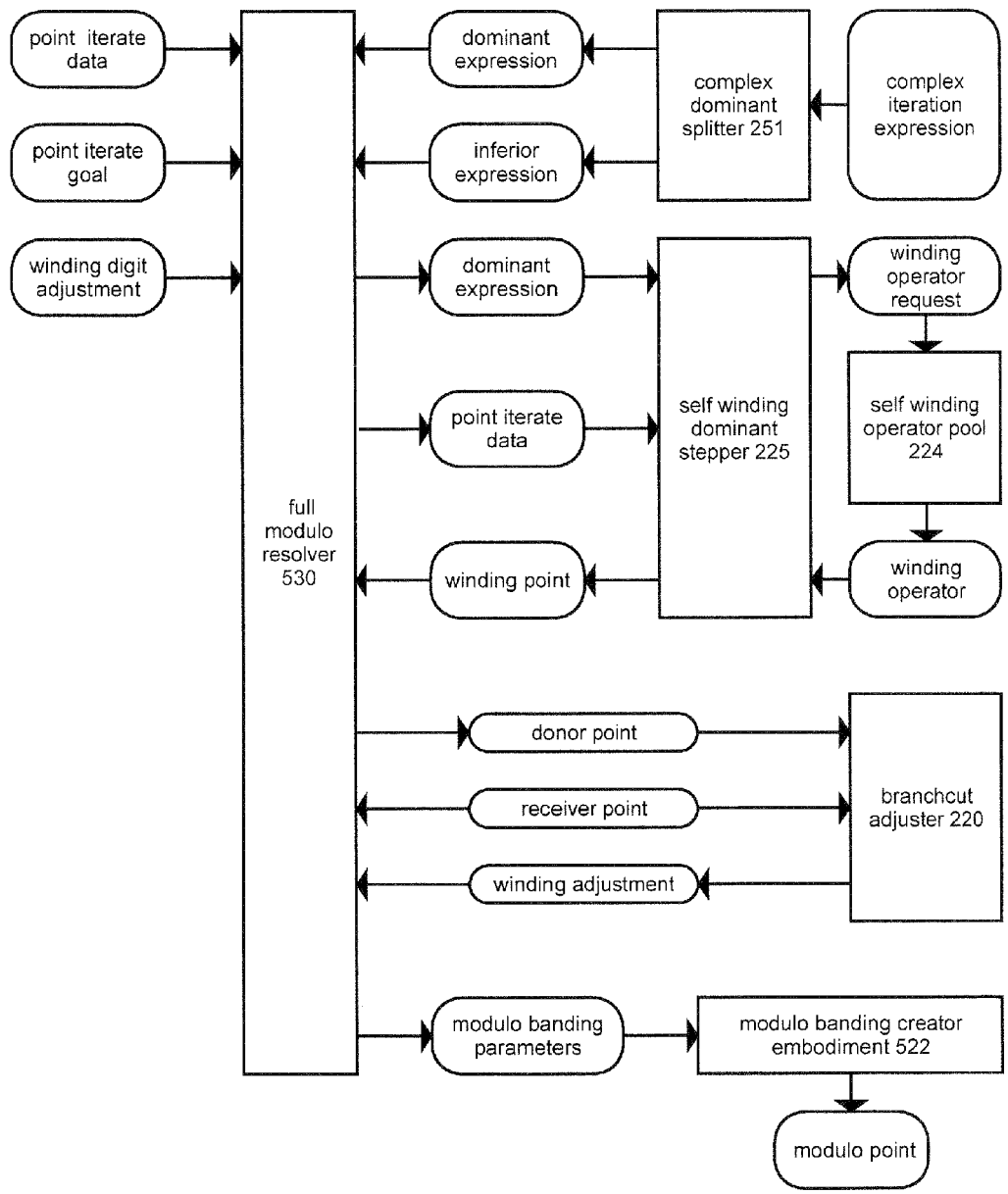

FIG.22  Optimized Modulo Iterator Embodiment
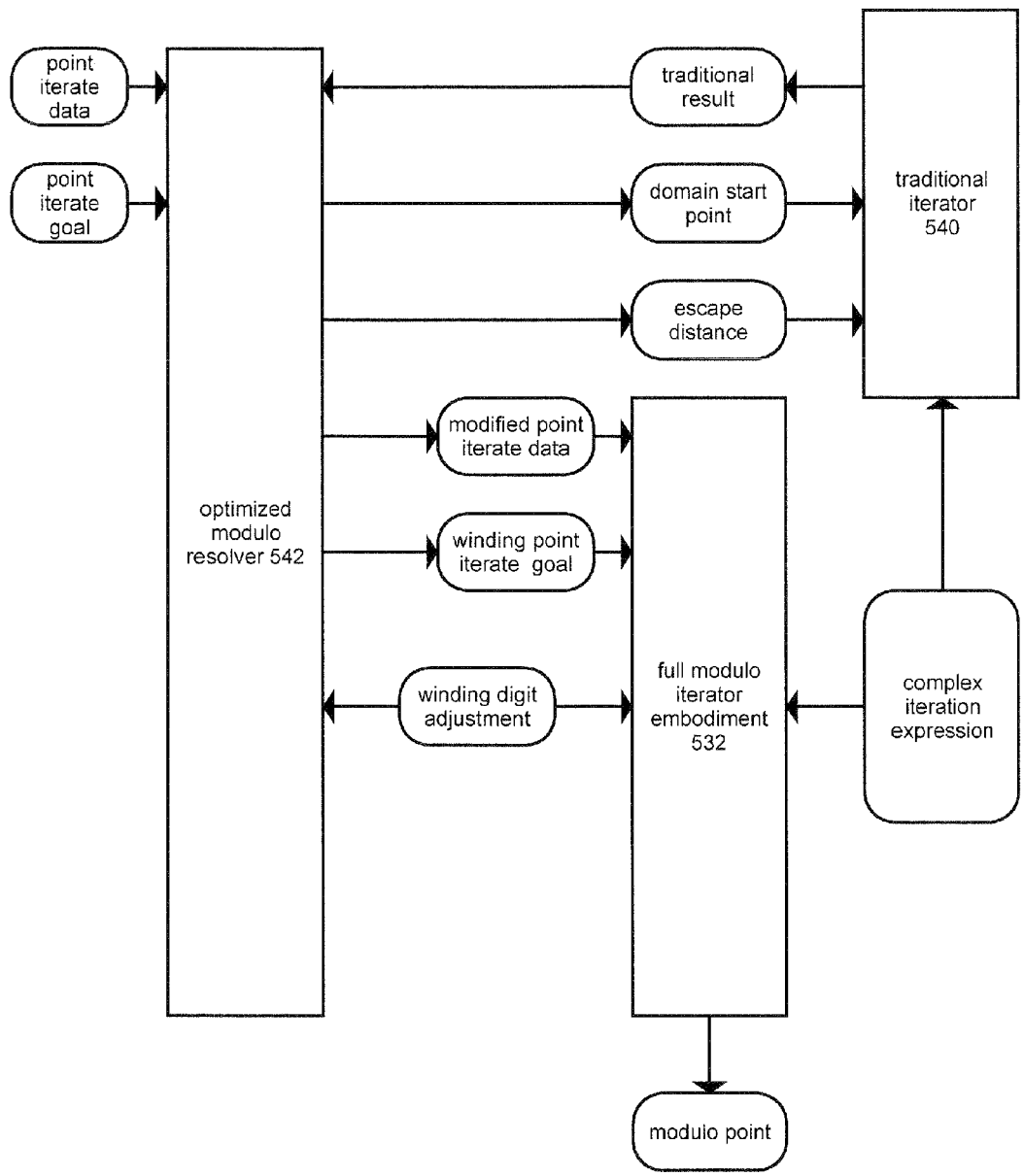

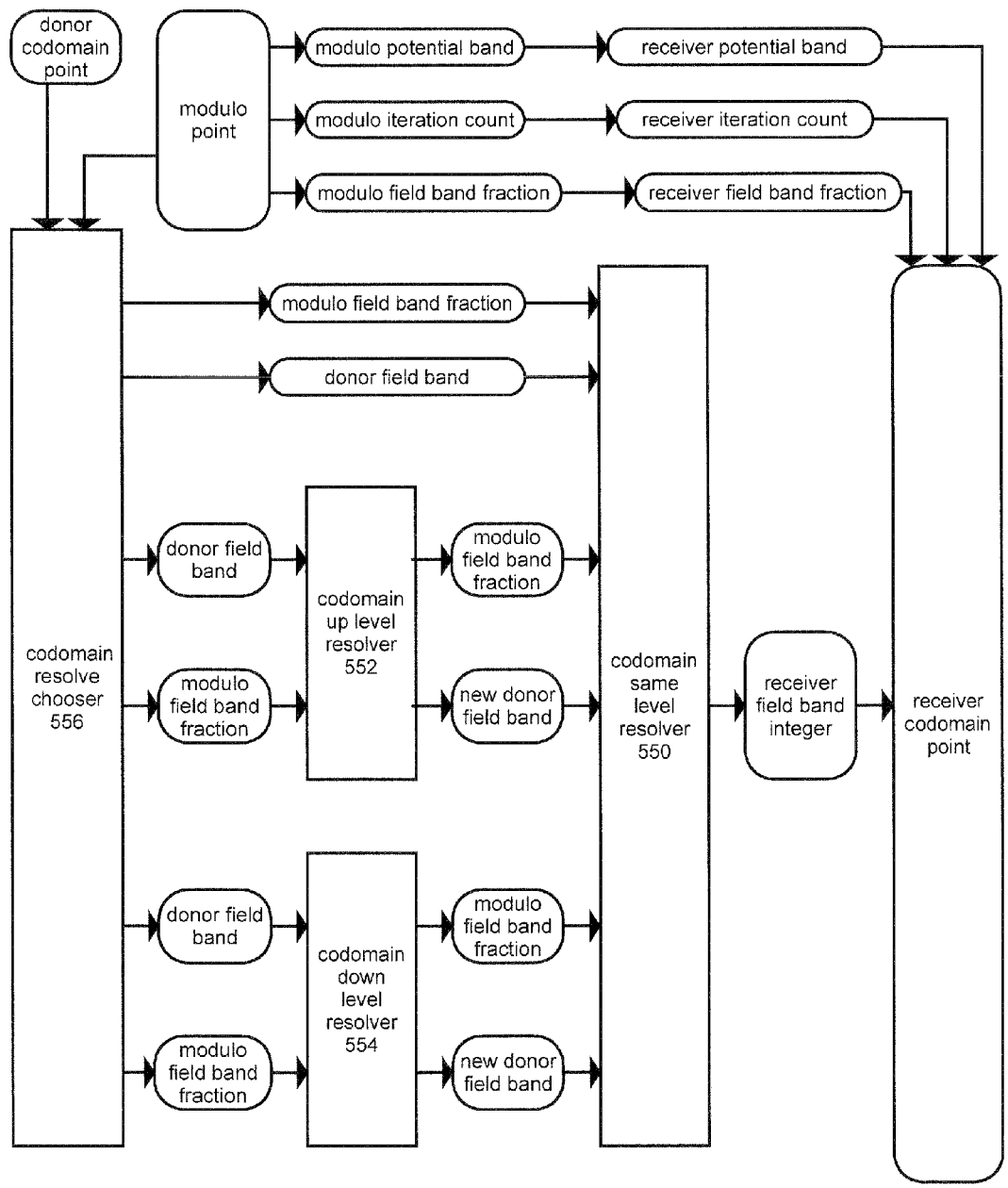
FIG.23  Codomain Point Resolver Embodiment

Same Level Resolve Diagrams
FIG.24A => +0
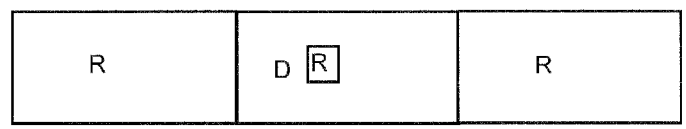
FIG.24B => +1
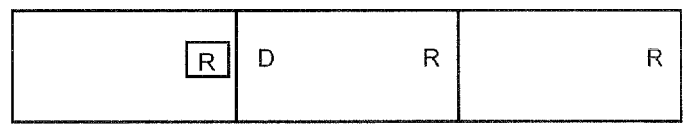
FIG.24C => +0
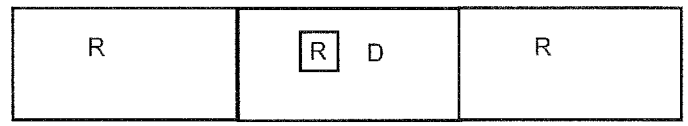
FIG.24D => -1
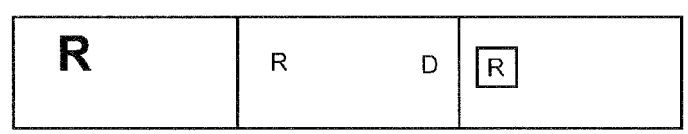

FIG. 25  Traditional Self Resolver Embodiment
PRIOR ART
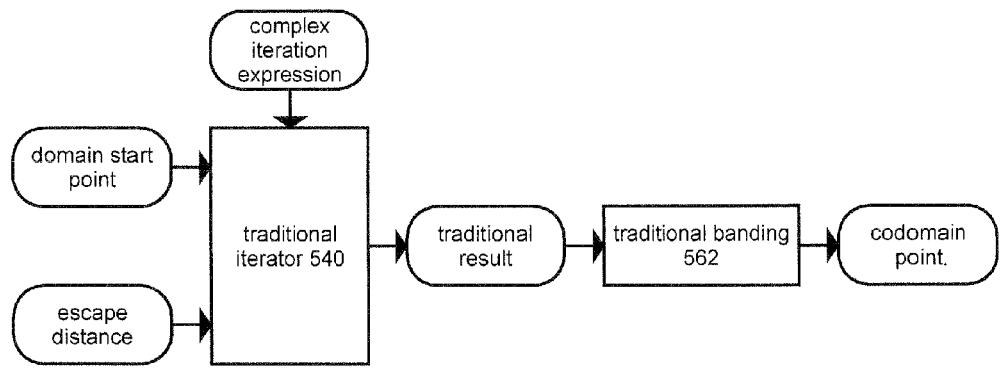

FIG. 26  Self Codomain Resolver Embodiment
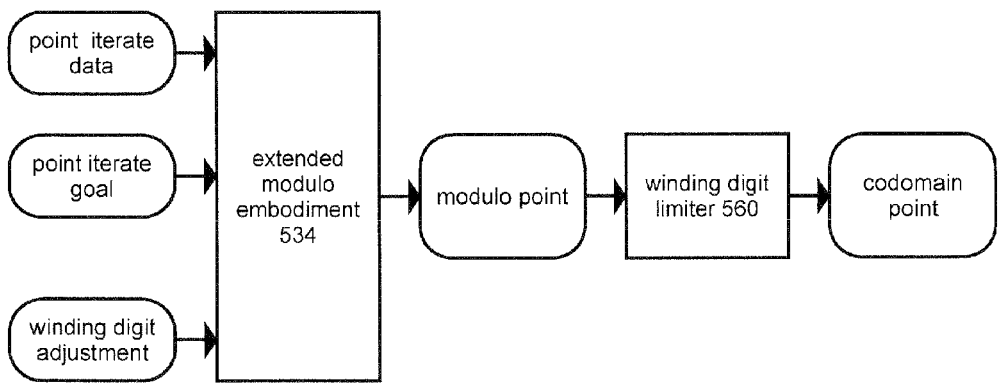

FIG.27  Traditional Decomposition Interval Embodiment
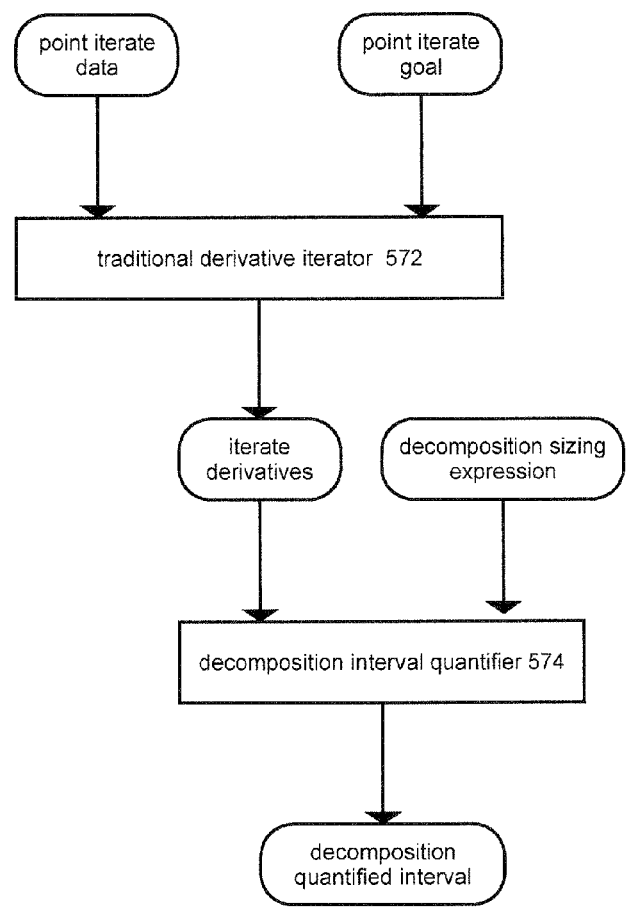

FIG. 28  Modulo Decomposition Interval Embodiment
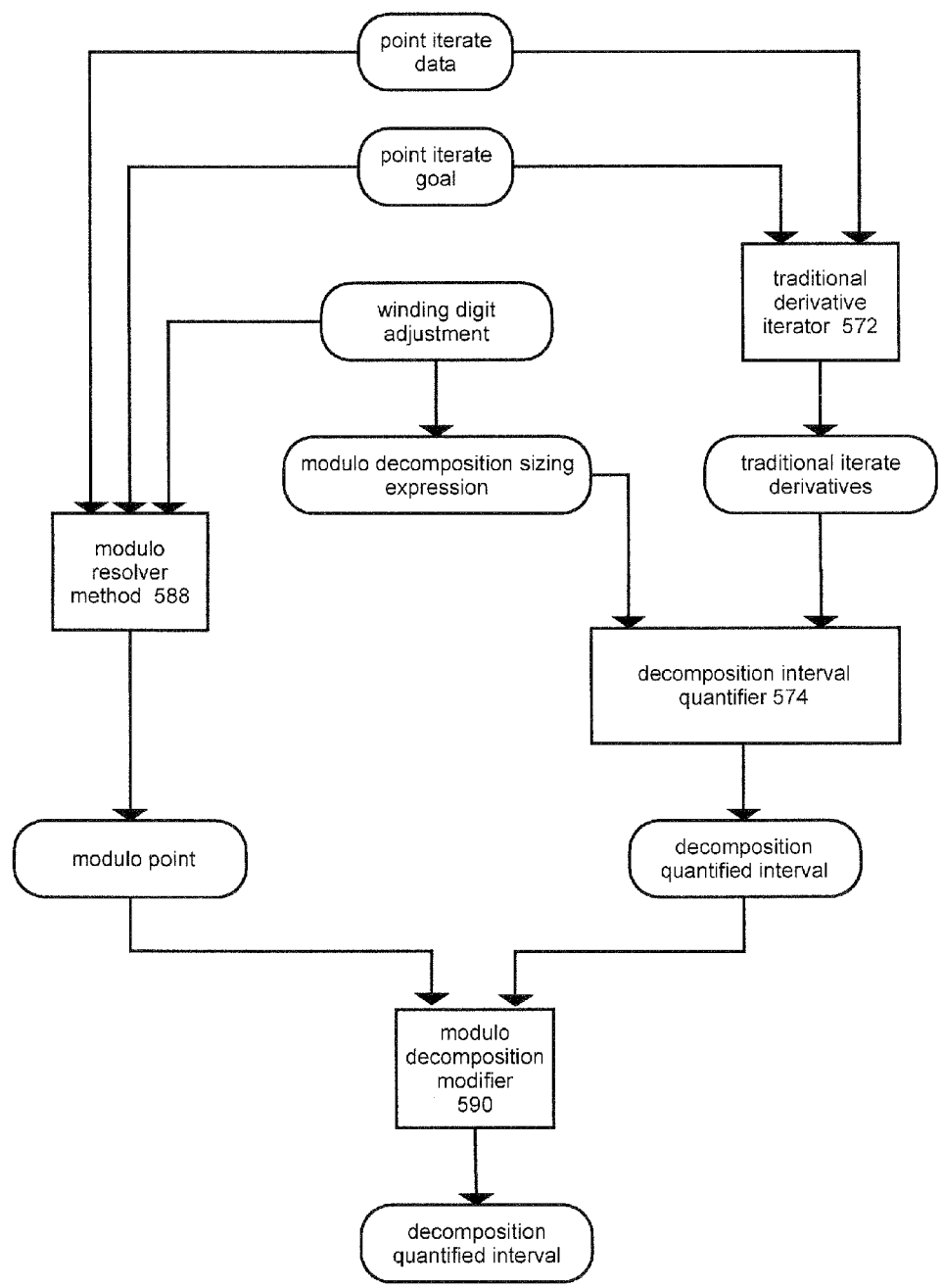

FIG.29    Codomain Interval Resolver Embodiment
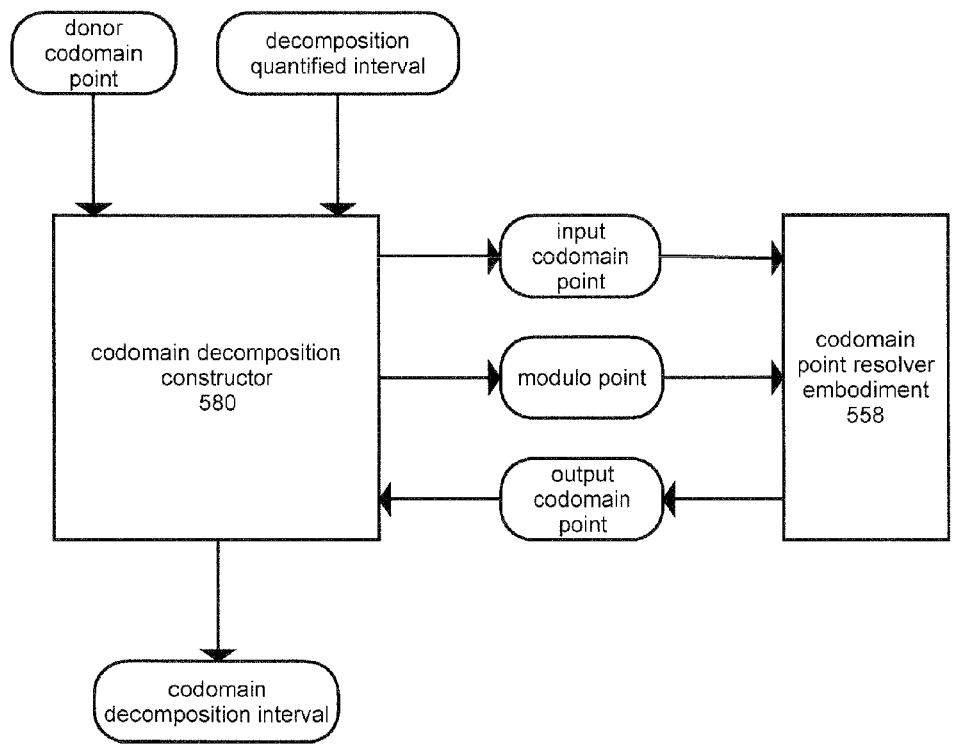

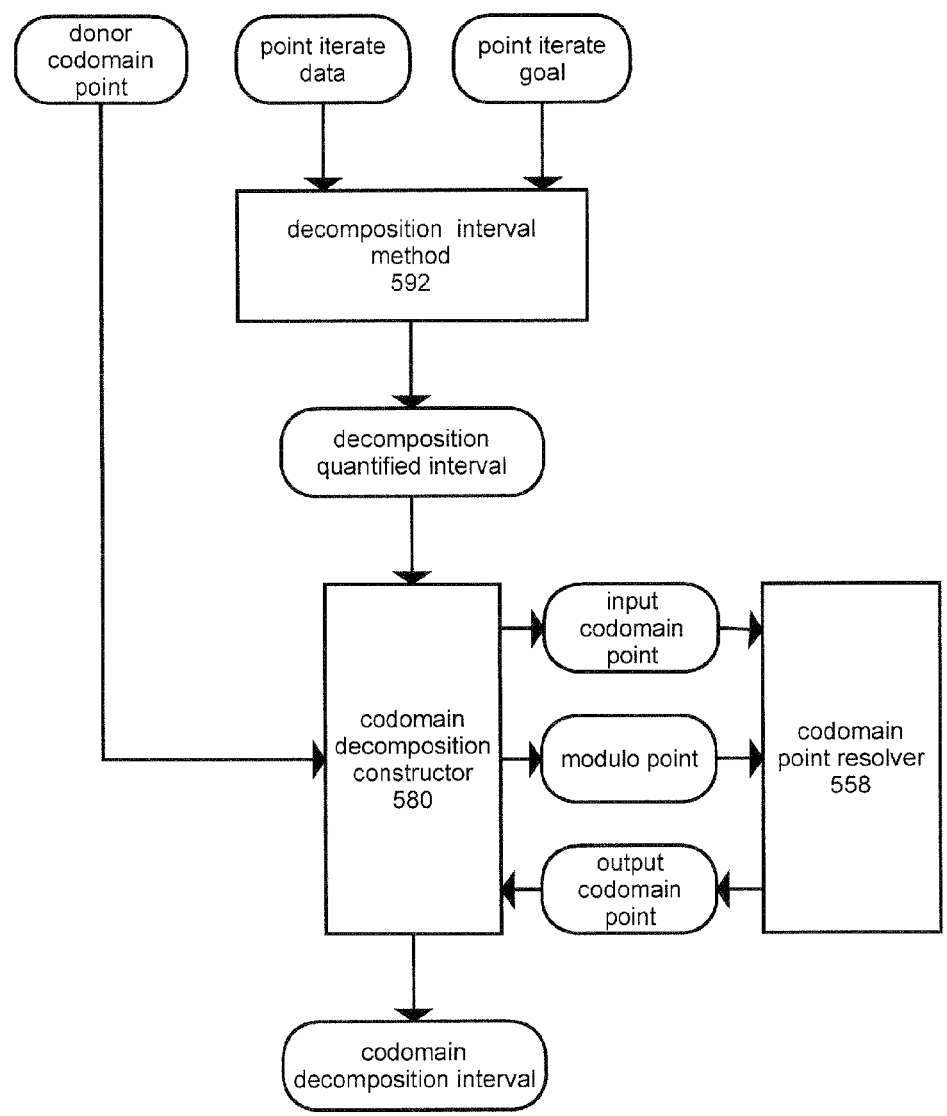
FIG.30 Codomain Interval Constructor Embodiment

FIG. 31     Codomain Chain Embodiment
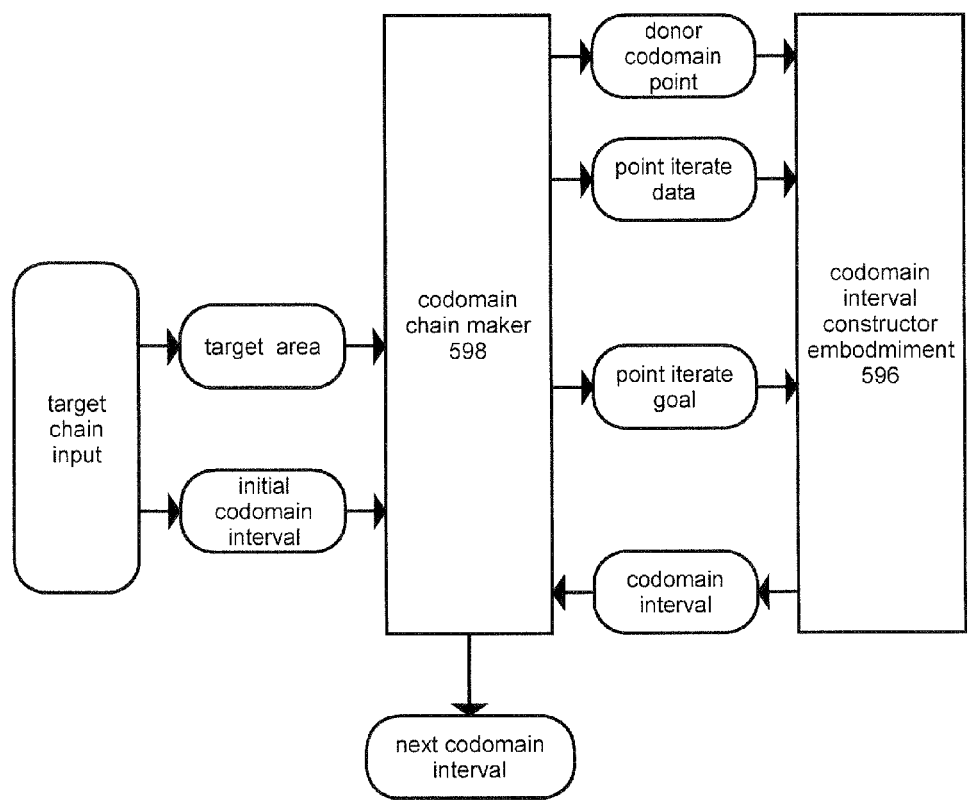

Chaining Diagrams
■ initial codomain interval
□ center codomain point
◯ valid interval
○ failed interval
FIG.32A
Periphery Chain
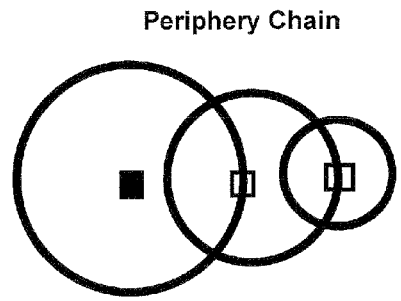
FIG.32B
FIG.32C
Failed Initial Jump Link
Successful Initial Jump Link
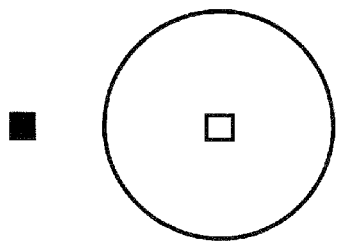
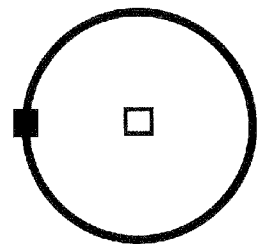
FIG.32D
FIG.32E
Failed Second Jump Link
Successful Second Jump Link
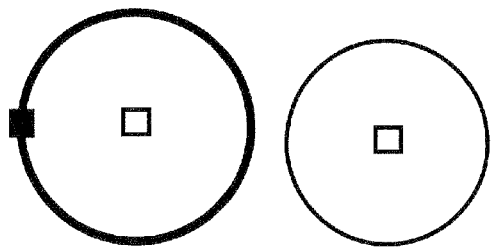
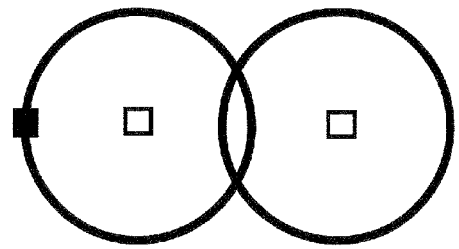

FIG. 33 <u>Generic Anchored Chain Embodiment</u>
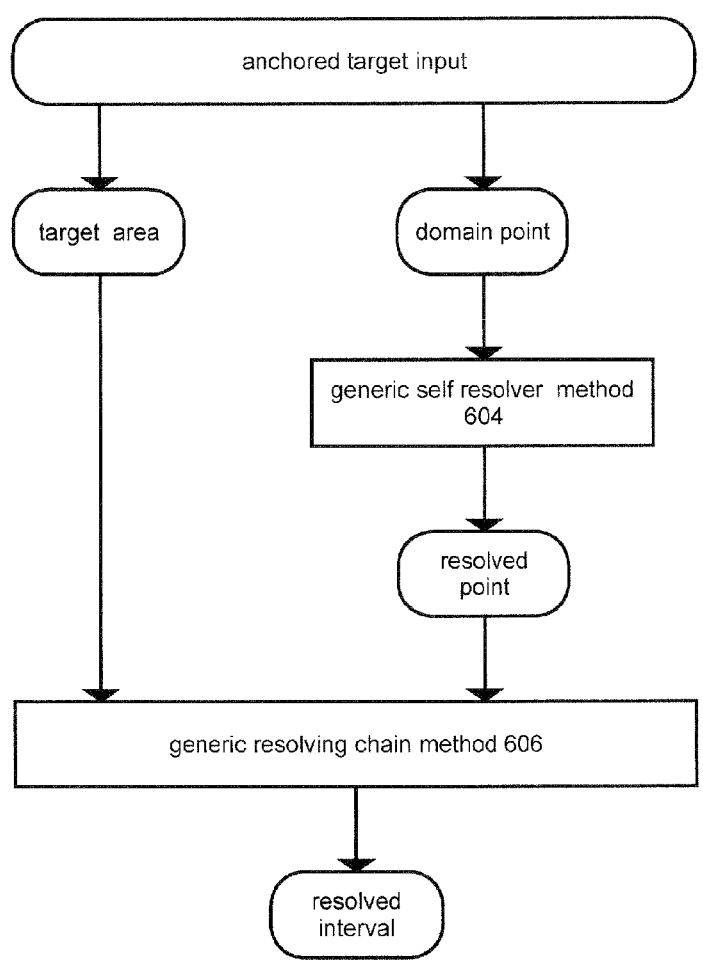

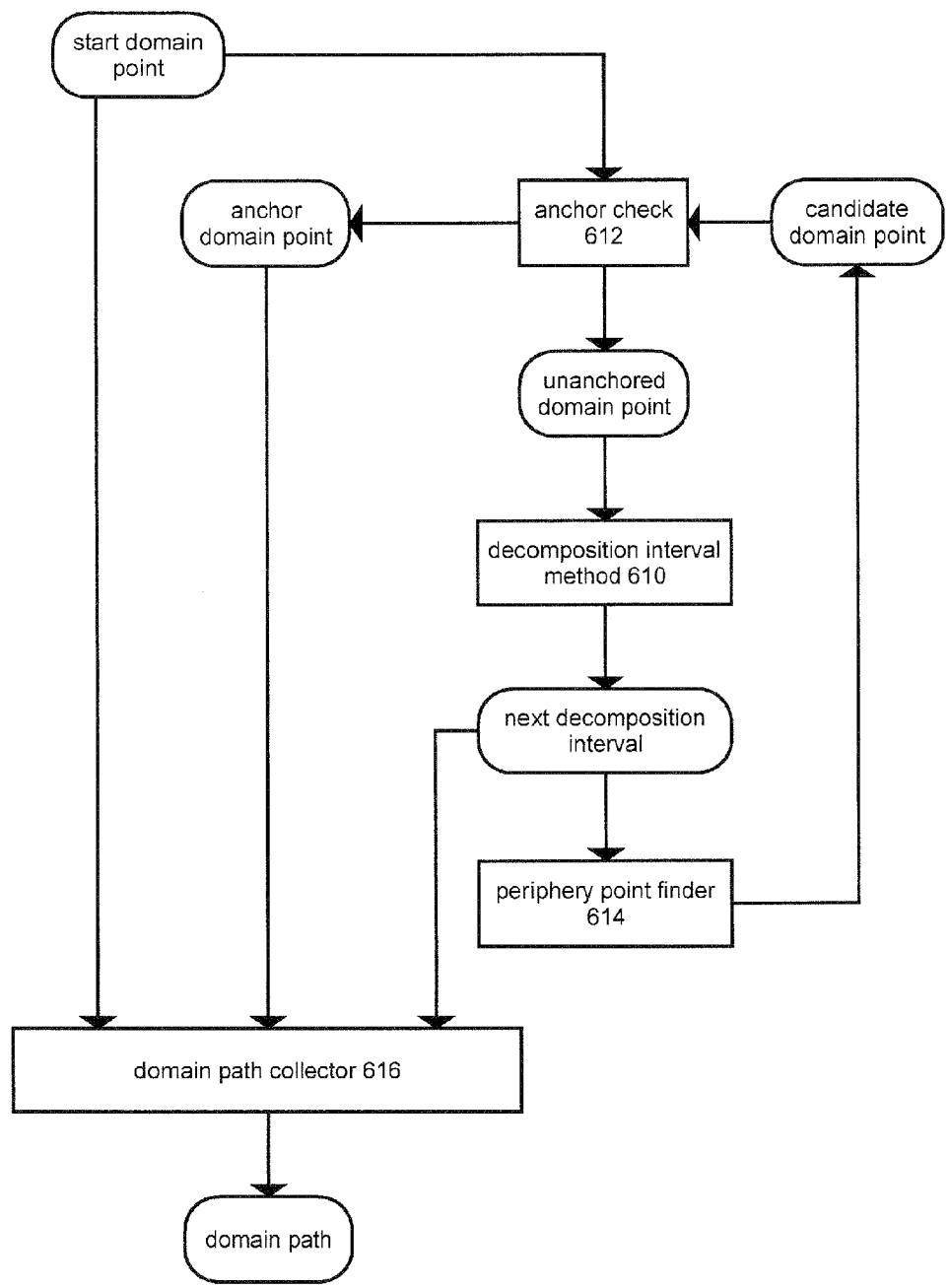
FIG.34 Periphery Pathfinder Embodiment

FIG. 35 Jumper Pathfinder Embodiment
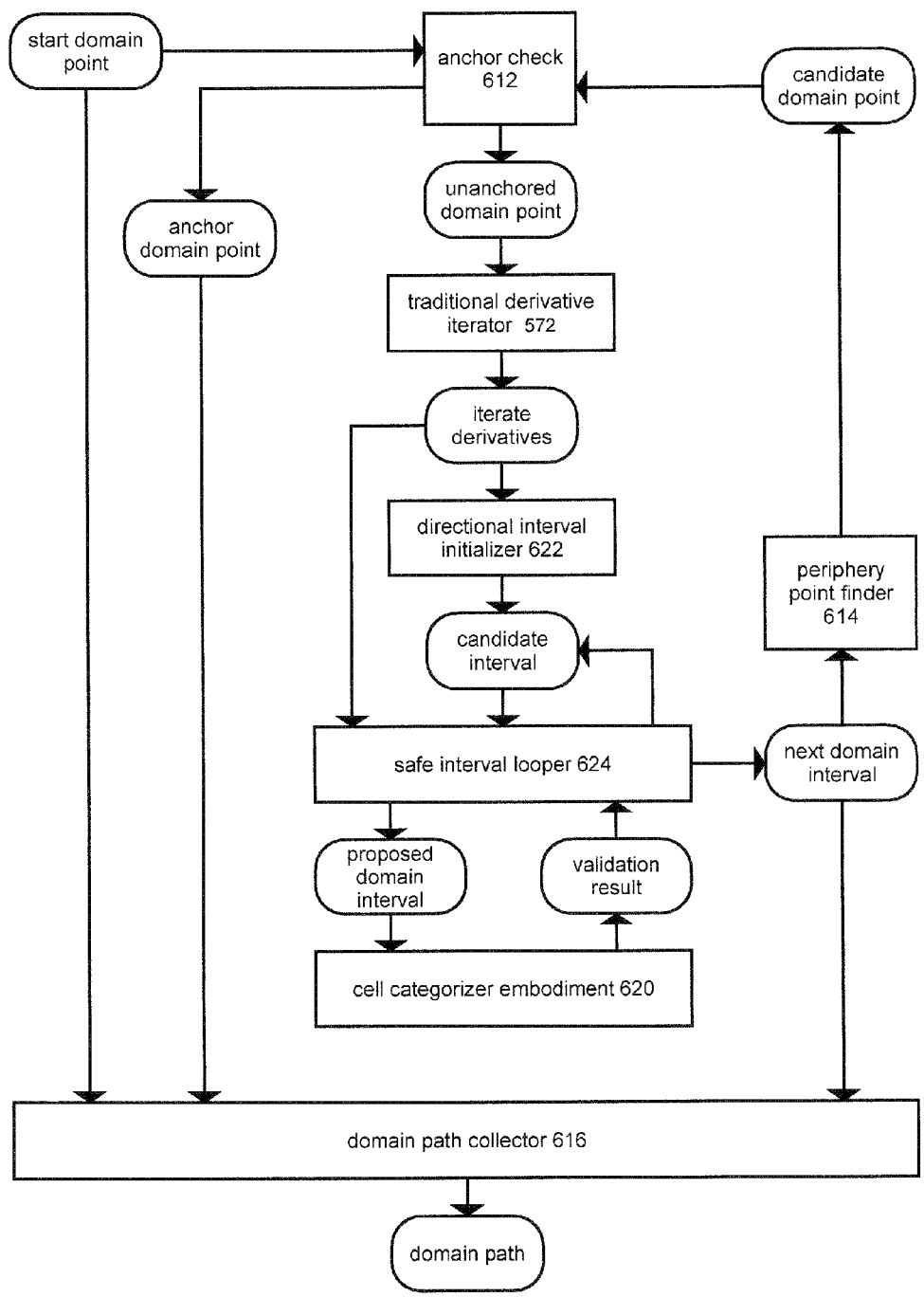

FIG.36  Path Resolver Embodiment
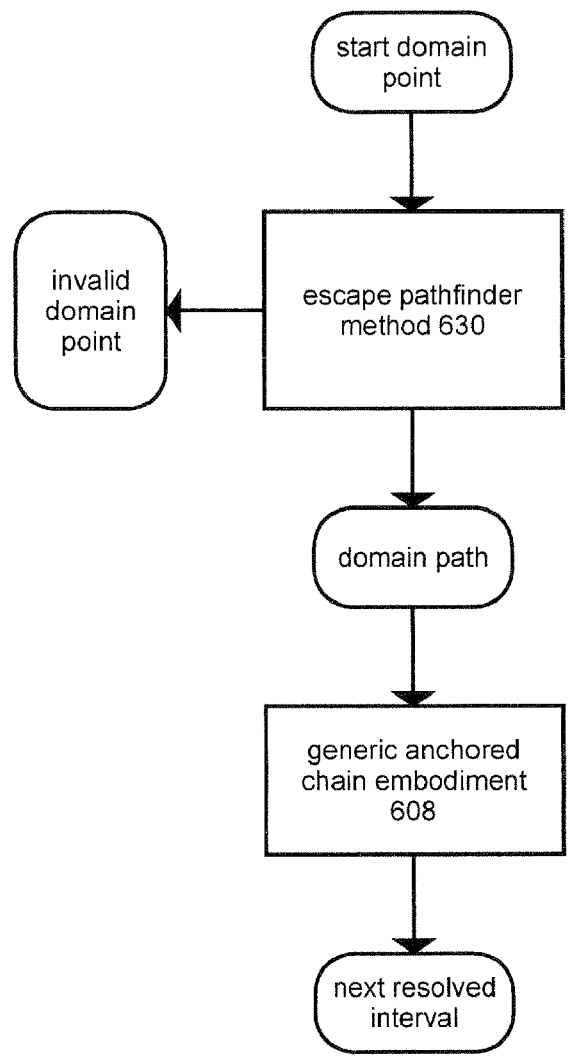

FIG.37    Buffered Path Resolver Embodiment
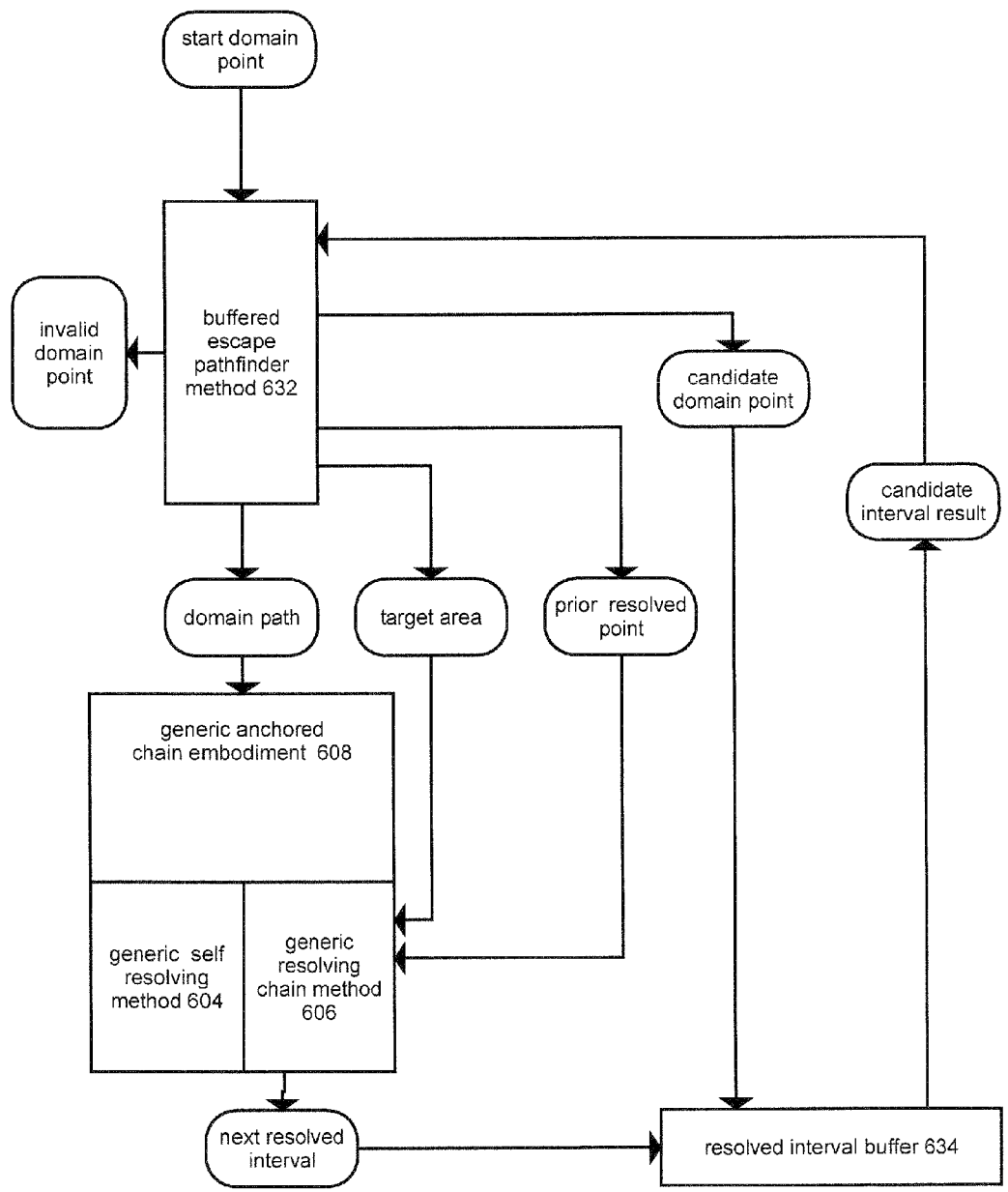

FIG.38  Pixel Center Bitmap Iterator Embodiment
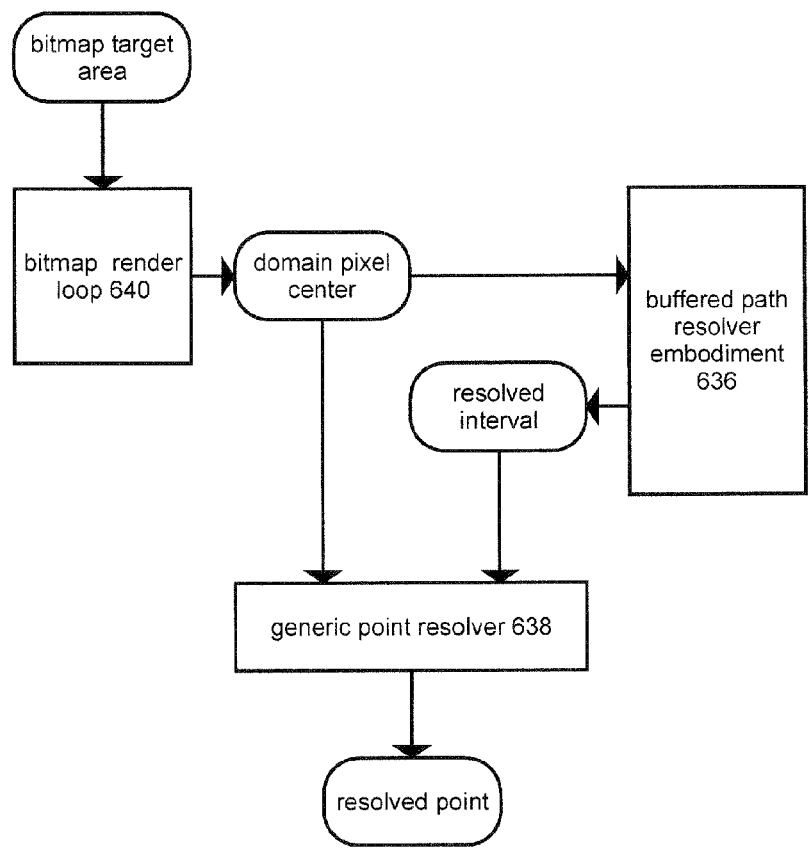

Hybrid Bitmap Iterator Embodiment

FIG.40  Automatic Transformer Embodiment

FIG.41    Generic Visualizer Embodiment

CHAOTIC AND FRACTAL FIELD LINE CALCULATIONS USING DECOMPOSITION AND SELF WINDING

CROSS-REFERENCE TO RELATED APPLICATIONS

See patent application for "EXPLOITATION OF TOPOLOGICAL CATEGORIZATION OF CHAOTIC AND FRACTAL FUNCTIONS, INCLUDING FIELD LINE CALCULATIONS", Ser. No. 11/336,187 filed Jan. 19, 2006, now U.S. Pat. No. 7,805,481, the entirety of which is incorporated herein by reference. See patent application for "COMPLEX AND HYPERCOMPLEX INCLUSIVE INTERVAL EXPRESSION EVALUATIONS WITH STABLE NUMERIC EVALUATIONS AND PRECISION EFFICACY TESTING". The embodiments of that application are included in the above prior application, and this application Ser. No. 11/336,166 filed Jan. 19, 2006, now U.S. Pat. No. 7,801,939.

FEDERALLY SPONSORED RESEARCH

Not applicable.

SEQUENCE LISTING OR PROGRAM

Short code sections are found in the text.

BACKGROUND OF INVENTION

While implementing an earlier patent, new embodiments of topological categorization sprung from serendipitous bugs which revealed a far faster technology was possible.

FIELD OF INVENTION

This invention generally relates to the chaotic functions and Julia set fractals which are generated from numerically iterating complex arithmetic functions.

PRIOR ART

Prior Art by Others

Decomposition of fractal and chaotic functions has been around for at least two decades. Recently, I discovered that a commercially available program, Ultra Fractal, not only can perform black and white decomposition, but that for each decomposition area, a partial "field line" value can be obtained. A reference to the user manual for this program is provided, together with a description and picture of a typical result, is given below.

The prior art can be used, in a limited way, with graphics techniques such as texture mapping. However, in the picture below, one can see each potential band is composed of $2^n$ number of gradient regions, where n is an integer which increases by 1 for each successive inner band. Based on the field line and potential, there is no way to disambiguate the field lines from one region from another region at the same potential; thus each region would receive the same coloring algorithm. Another problem is that there is imprecision in the continuity when moving from one potential band to a higher or lower band. All these problems relate to the simple problem that within the prior art of others, there is no way to perform a one-to-one smooth conformal mapping between the domain of complex numbers and the potential and field line values.

The online user manual for Ultra Fractal is found at http://www.ultrafractal.com/download.html. On page 168, I found this:

Decomposition

The Decomposition coloring algorithm colors fractals according to the "angle" of the last value of z from the fractal formula. The angle is decomposed and distributed over the full range of the gradient. This coloring algorithm tends to create circular bands all over the image that contain all colors from the gradient. Low values (for example 4) for the bail-out parameter of the fractal formula usually give the best results. With convergent fractal types, such as Newton or Nova, Decomposition usually does not create smoothly colored images, but it can still be interesting.

See Also

Basic

Binary Decomposition

Standard coloring algorithms

The manual, on the same page, shows a picture resulting from this technique. This picture is shown in FIG. 42. The original picture was in color.

In this patent application, refer to FIG. 25, Traditional Self Resolver Embodiment, which diagrams this technique as I understand it.

Prior Art by this Author

My patent application for "EXPLOITATION OF TOPOLOGICAL CATEGORIZATION OF CHAOTIC AND FRACTAL FUNCTIONS, INCLUDING FIELD LINE CALCULATIONS" contains the only prior art on the process of self-winding iterated functions, as known to me: see the above references to related patent applications. That document provided a method for calculating field line values, which together with potential values, allowed for the complete conformal mapping between the complex domain and the potential and field line values. However, as complete as it was, the process is hampered by the performance of complex interval processing.

OBJECTS AND ADVANTAGES

Accordingly, several objects and advantages of the invention are:

Speed:

The previous patent application used complex interval processing to define valid regions of the complex plane where a winding count could be assigned. The new methods use only the arithmetic necessary to calculate the iterated function, along with, sometimes, the derivatives. Because most iterations are based on simple multiplies and additions, the derivatives are quick to calculate, particularly because the functions are analytic (i.e. Cauchy-Schwarz equations), the partials contain redundant processing which can be eliminated.

Memory:

If one is only calculating local decomposition coordinates (described later), then the full winding count is not needed, and elaborate memory structures are not needed.

Simplified Arithmetic:

Because this method typically requires iterations using only adds and multiplies, it is much easier to implement ultra-high precision software number systems which can perform the iterations. Hardware floating point is still useful when implementing functions (e.g. Log) which are applied to the resulting iteration values, where ultra-high precision is no longer needed.

Winding Count Shifting:

In order to create conformal mappings with the new methods, it is useful to keep the decomposition regions as large as possible. However, to obtain precision, each point must be iterated out to a very large escape distance, which results in more iteration steps. Each iteration step shrinks the decomposition region size; that is, the number of regions for each potential band is increased dramatically. A new technique allows one to recover the original size of the regions so that they roughly maintain or improve the size as shown in the prior art, above, but at the same time the extra precision ensures that continuity is maintained across potential bands. FIG. 18 shows a typical decomposition of the Mandelbrot. Note that the numerals are texture mapped onto each region and that the regions from successive potential bands exactly correlate.

Conclusion

Performance is improved over prior results. Further, objects and advantages will become apparent from a consideration of the ensuing description and drawings. SUMMARY In accordance with this invention, a topological categorization method based on self-winding iterations offers improved performance. This document relies heavily on terminology, descriptions, and figures of the prior patent, "EXPLOITATION OF TOPOLOGICAL CATEGORIZATION OF CHAOTIC AND FRACTAL FUNCTIONS, INCLUDING FIELD LINE CALCULATIONS". Figures are assigned numbers in succession after the numbers utilized in the prior patent.

DRAWINGS

From included Prior Patent Application:

FIG. 2 shows a list of optimal inclusive disc interval operators.

Figure 1:
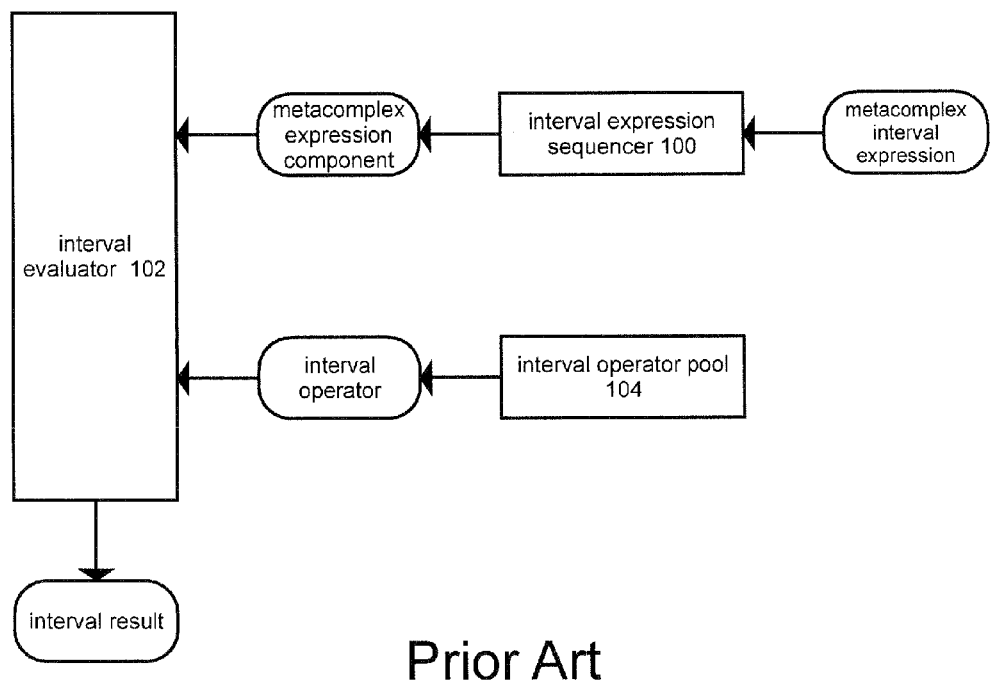
FIG. 1 shows the basic components for evaluating an interval expression, as in the prior art.
Figure 3:
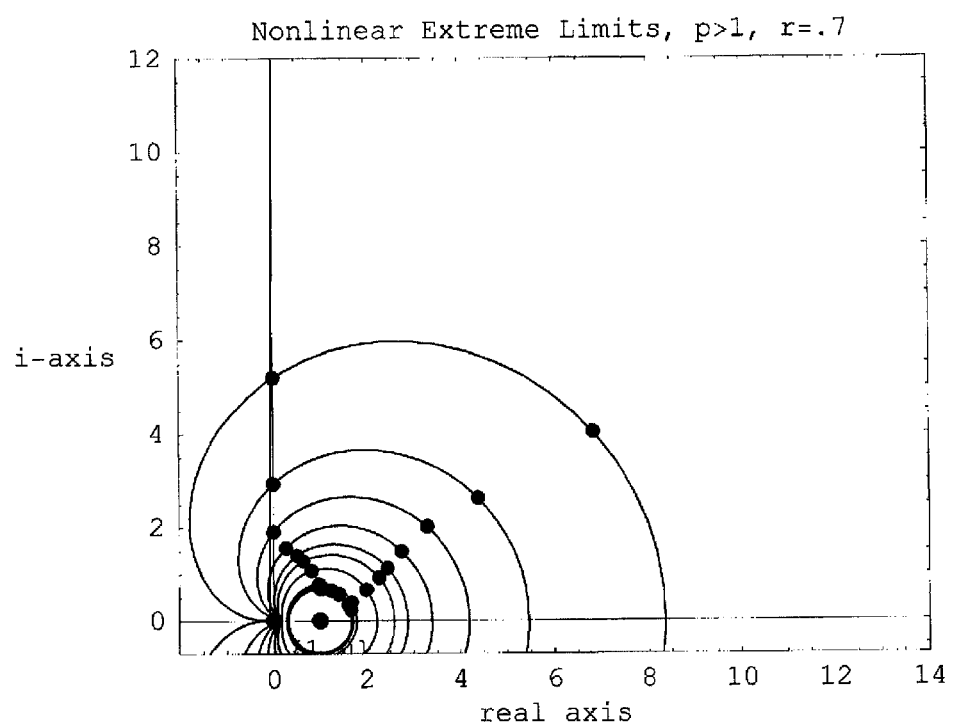
FIG. 3 shows the setup of points to the left and right of crest of a curve, which is the bounded target of a nonlinear search.
Figure 4:
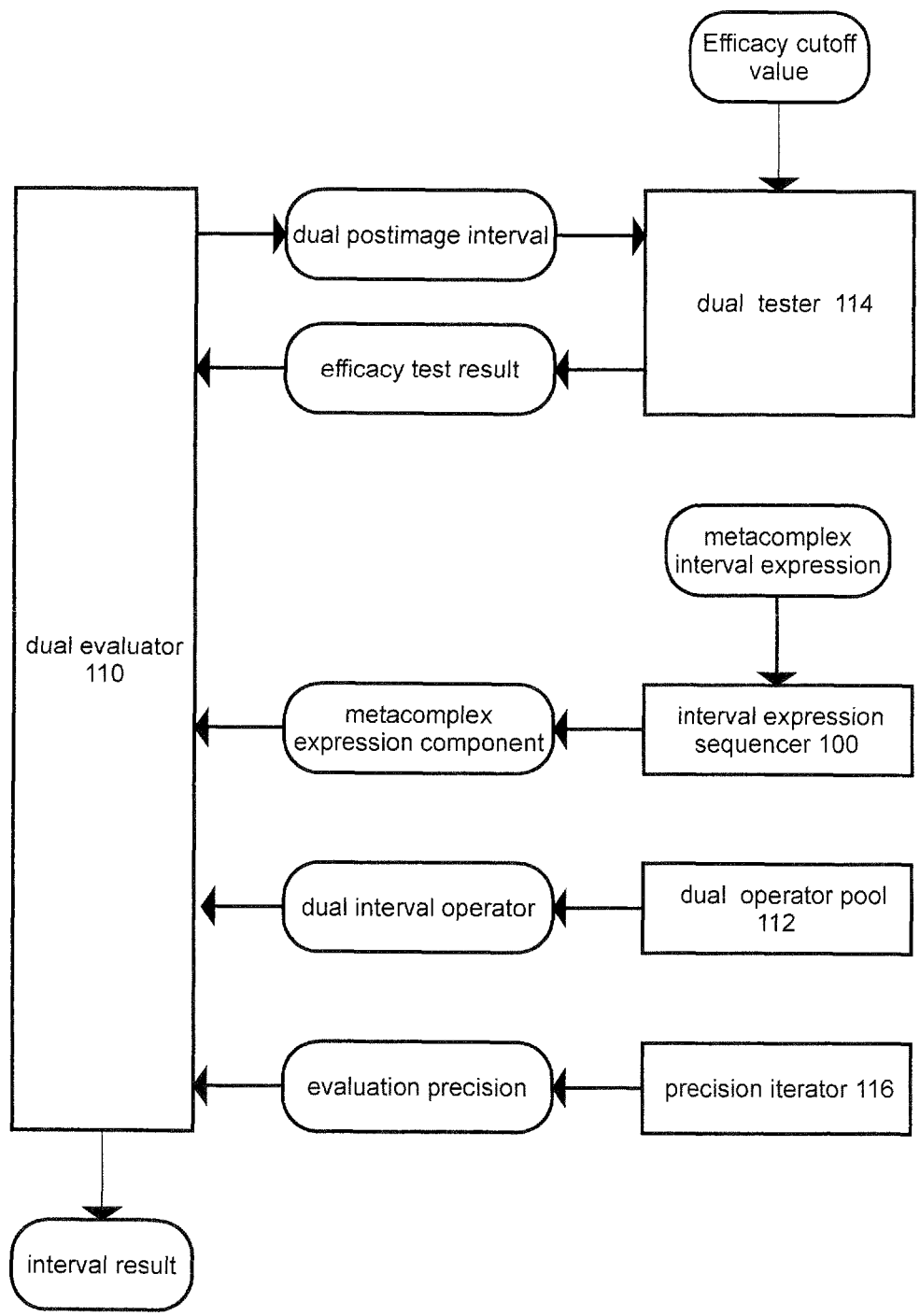
FIG. 4 shows the precision efficacy evaluation embodiment for evaluating an interval expression while detecting inadequate precision.
Figure 5:
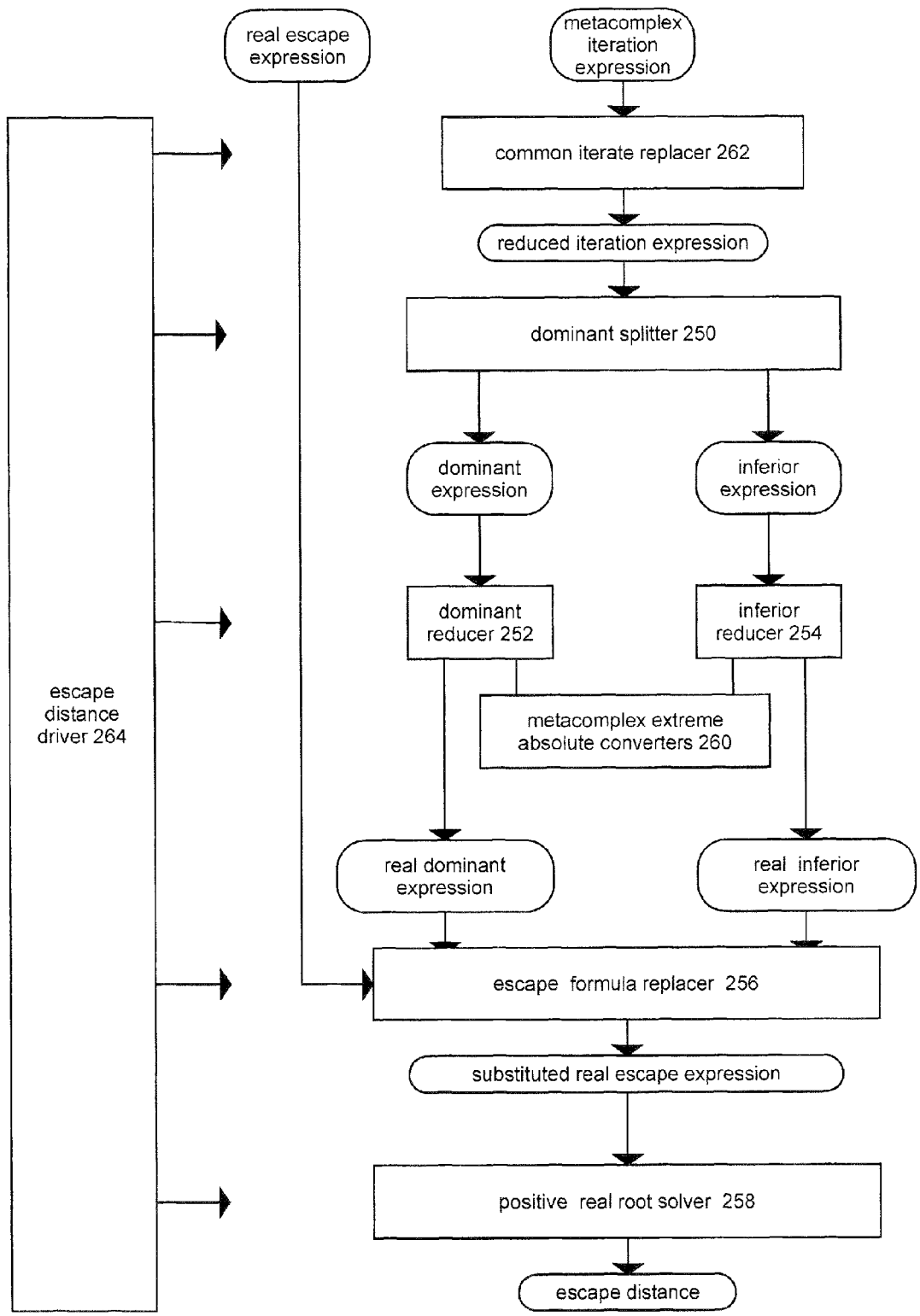
Figure 6:
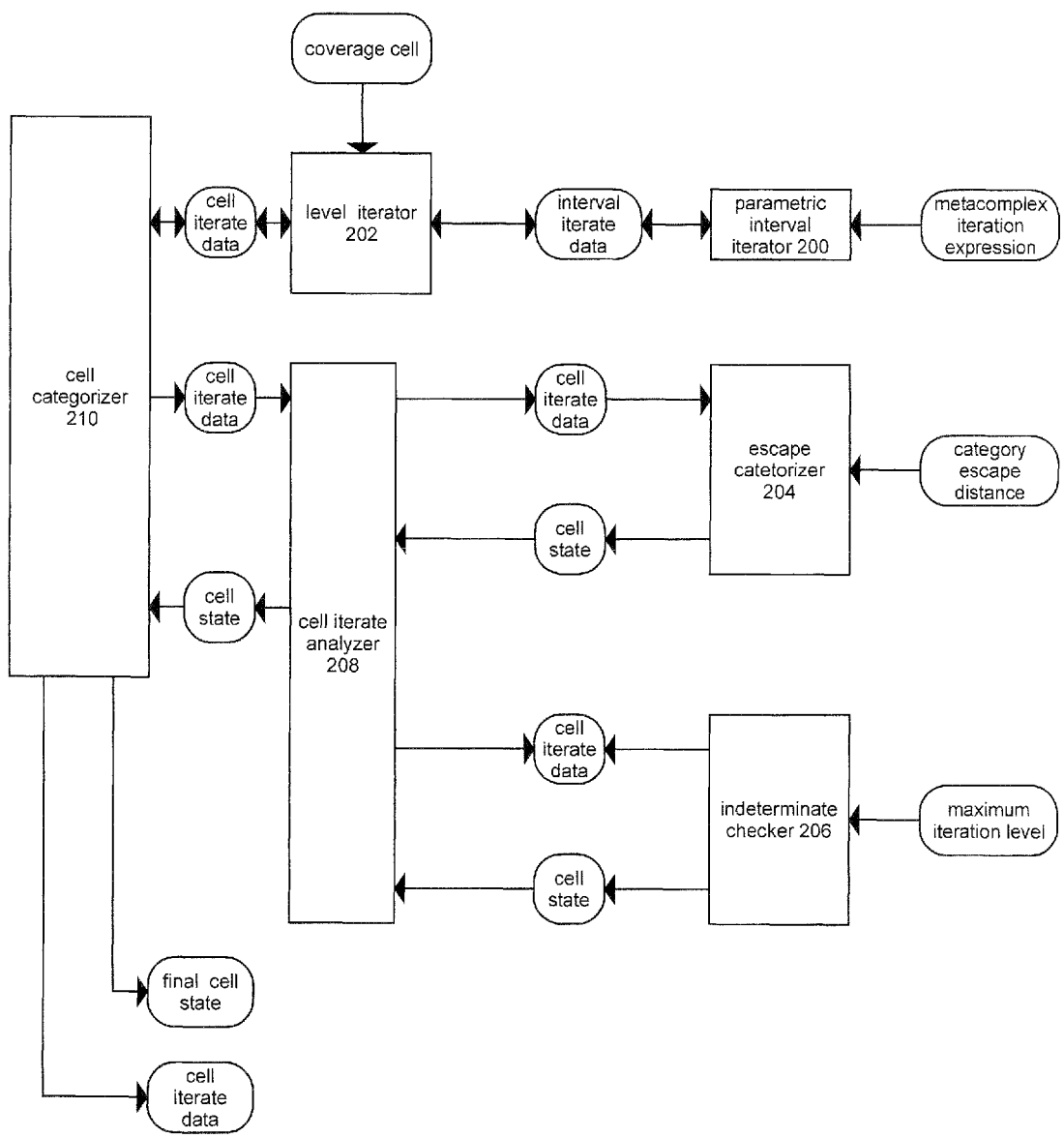
Figure 7:
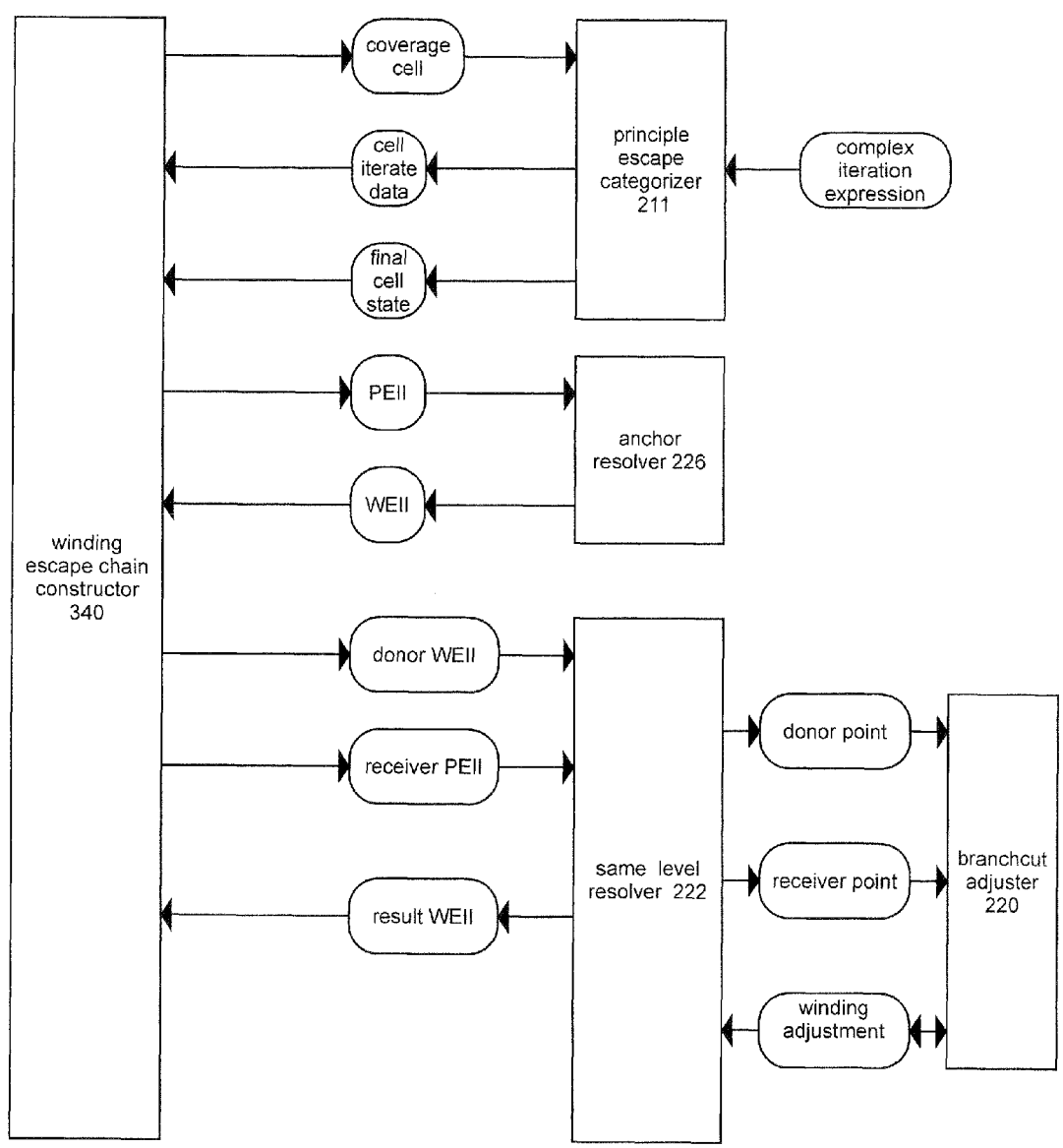
Figure 8:
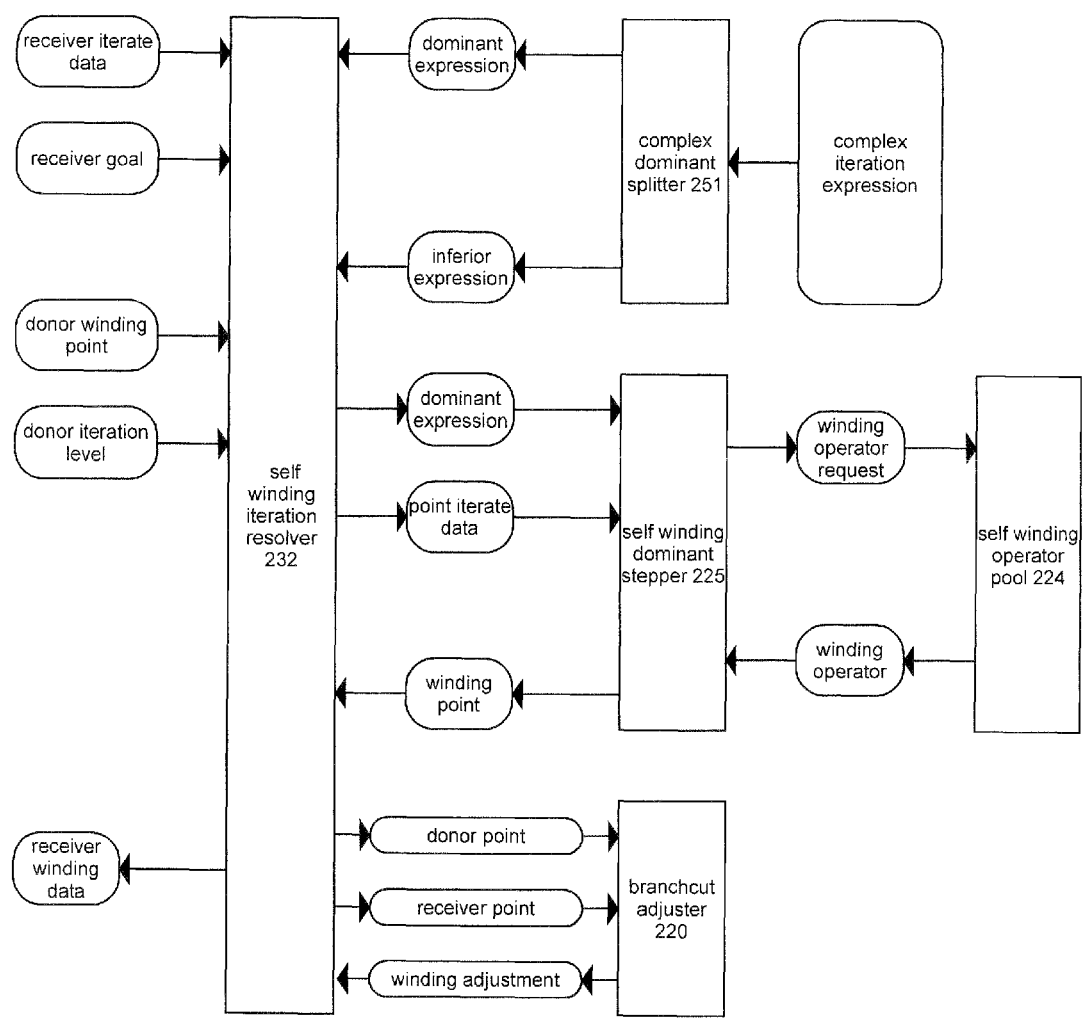
Figure 9:
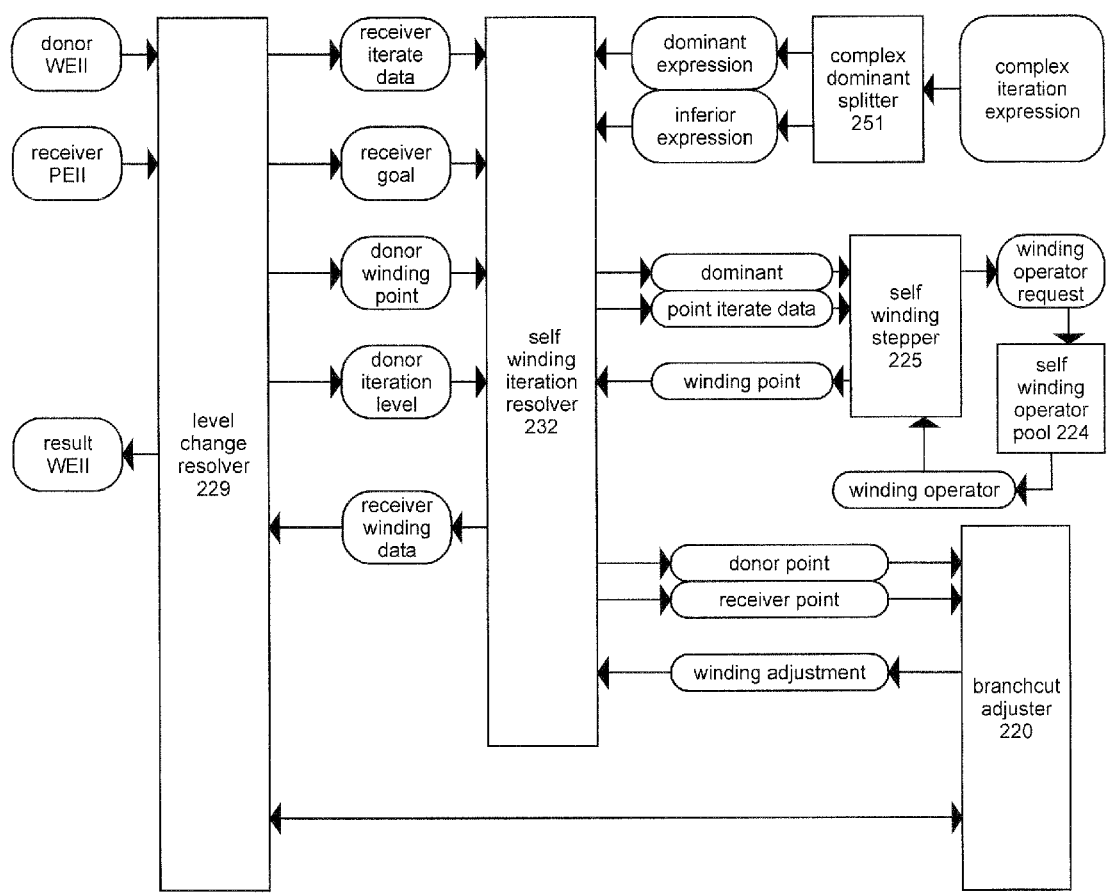
Figure 10:
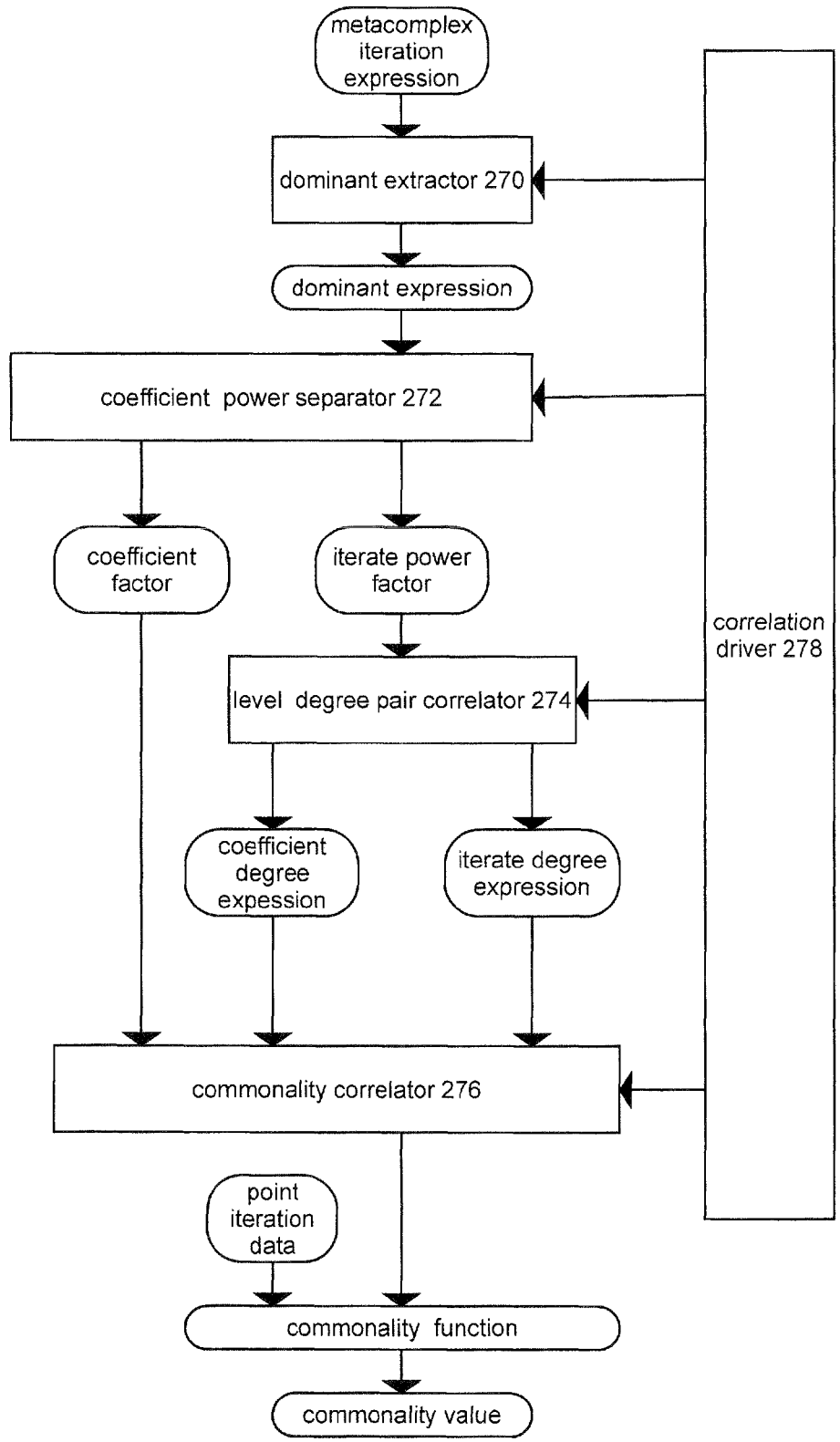
Figure 11A:
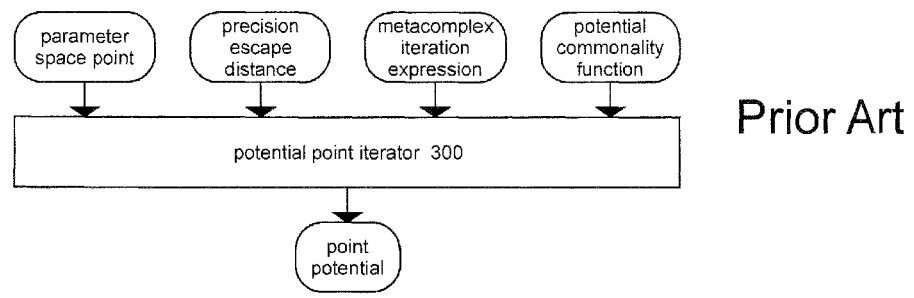
Figure 11B:
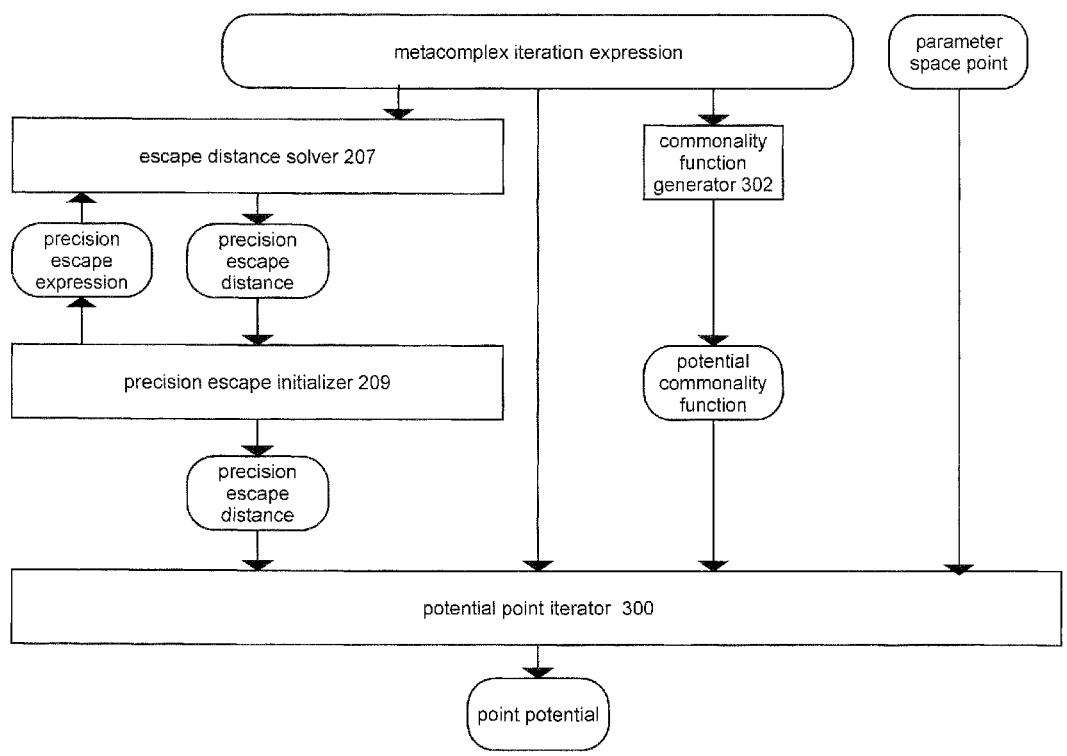
Figure 12A:
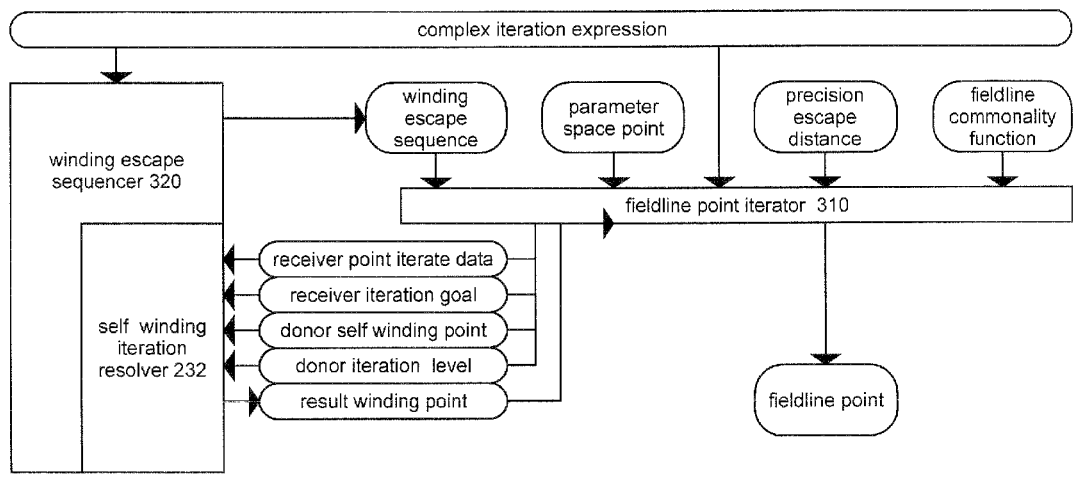
Figure 12B:
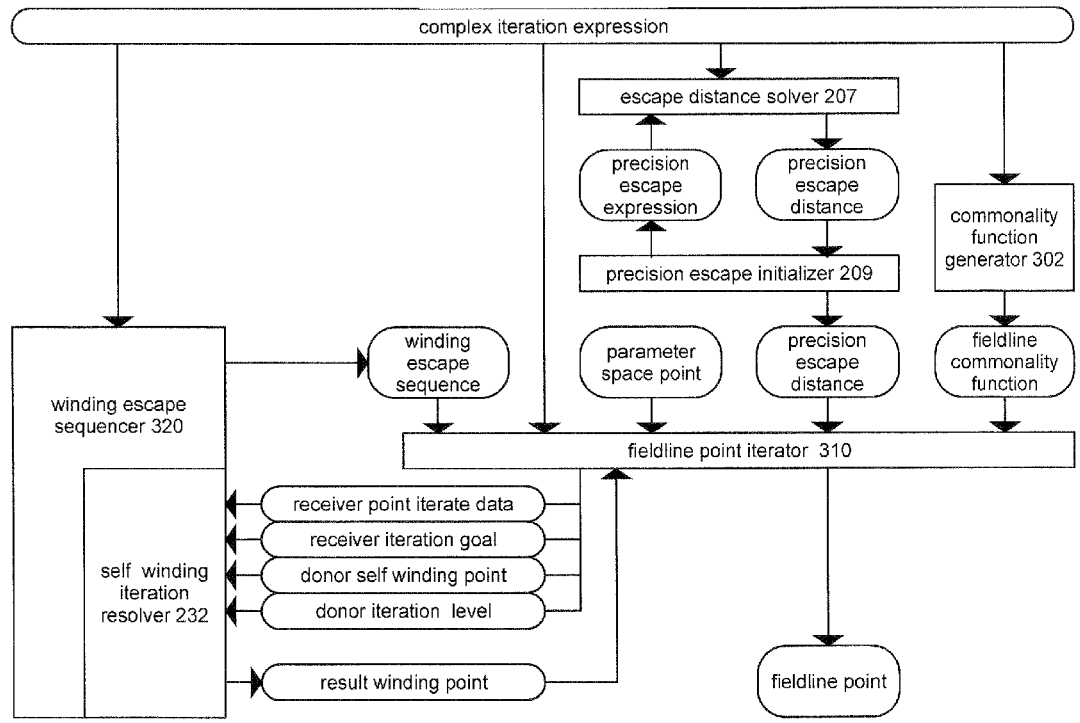
Figure 13A:
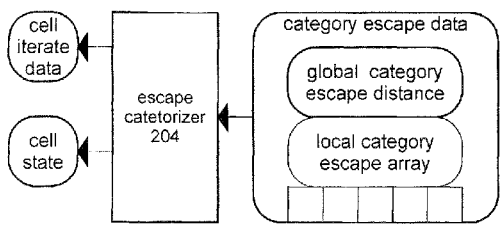
Figure 13B:
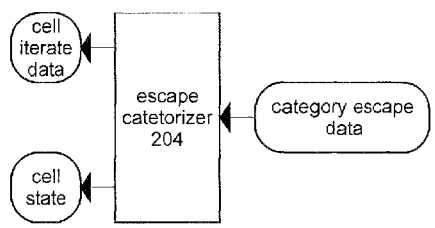
Figure 13C:
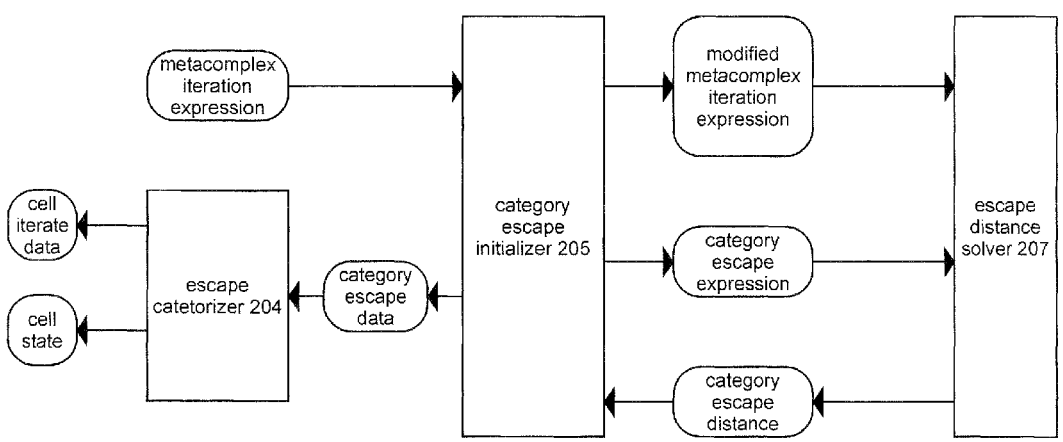
Figure 13D:
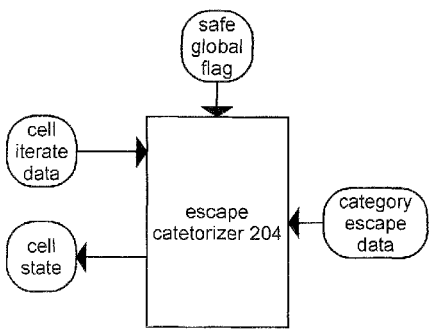
Figure 13E:
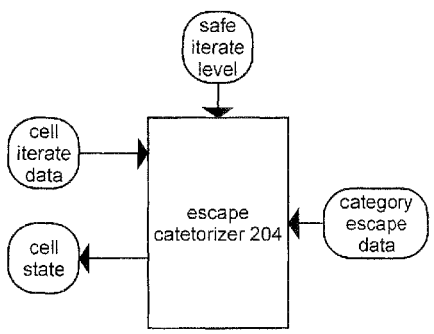
Figure 14:
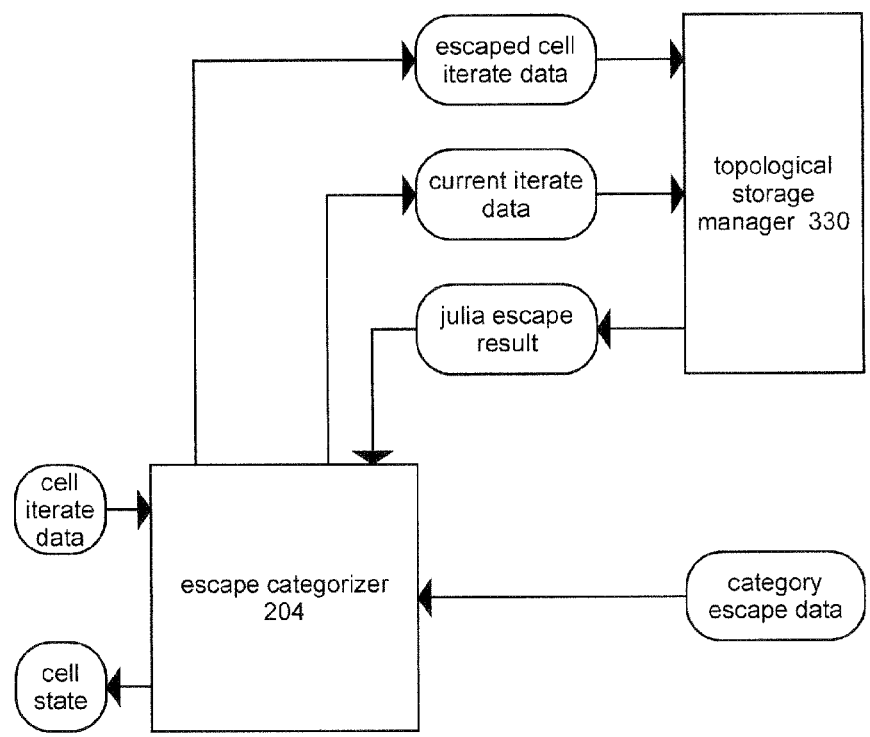
Figure 15:
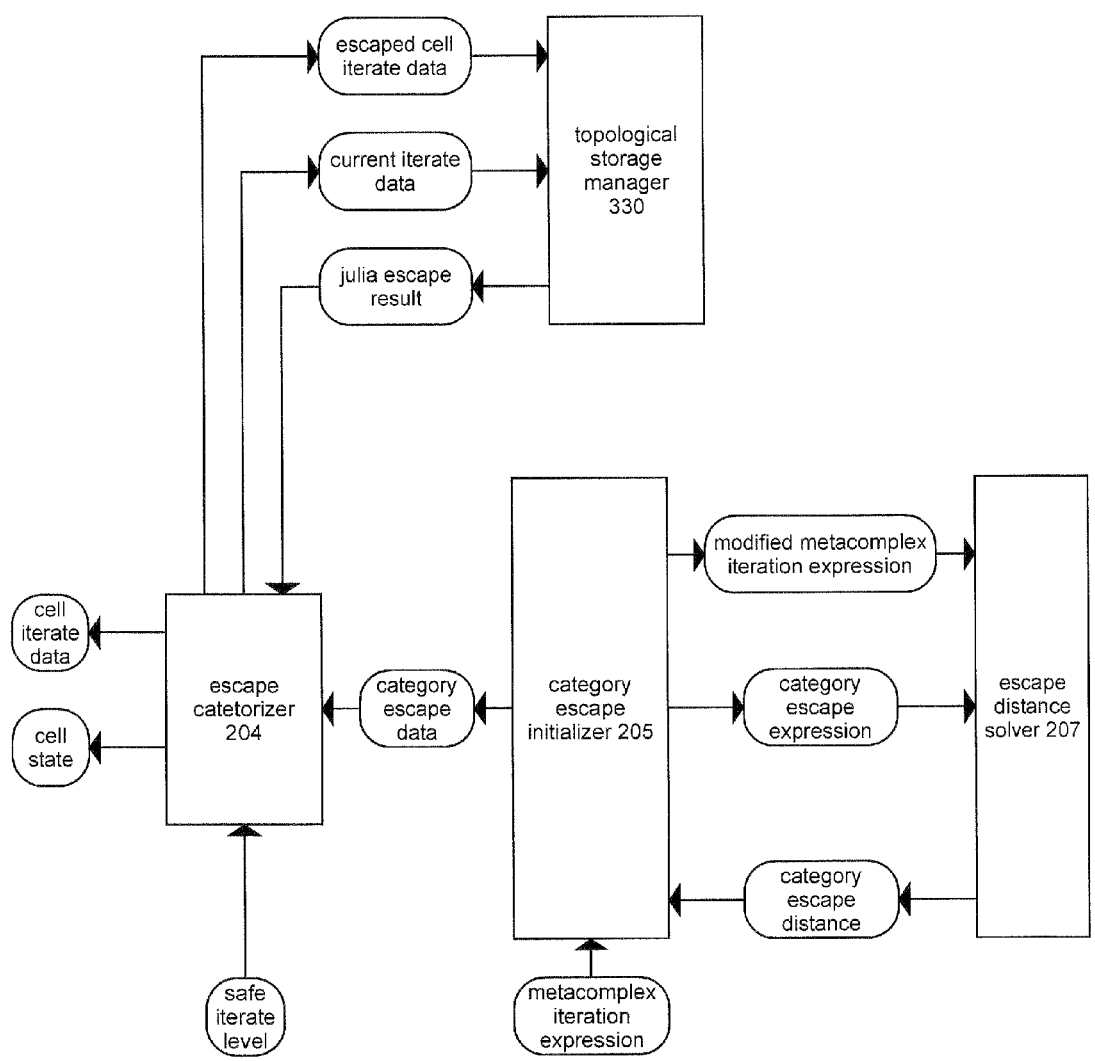
Figure 16A:
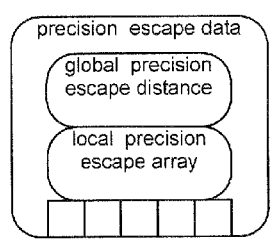

FIG. 5 block diagram for generic calculation of escape distances of discrete dynamic system FIG. 6 block diagram of an interval escape categorization to establish interval and principle escape sequences FIG. 7 block diagram for finding winding counts on independent iteration levels FIG. 8 block diagram for iteration, forward and reverse, of a winding point FIG. 9 block diagram for resolving winding escape sequences, FIG. 10 block diagram for creation of a function for correlating values terminating at different iteration levels, FIG. 11A block diagram of traditional method for iterating the potential within a discrete dynamic system, FIG. 11B block diagram for using automatic distance values and correlation functions FIG. 12A block diagram of system for creating winding escape chains and iterating field lines, FIG. 12B block diagram of automated system for creating winding escape chains FIGS. 13A-E block diagrams of enhancements for categorizing intervals FIG. 14 block diagram for Julia set enhancement for checking intervals for escaping FIG. 15 block diagram incorporating a combination of optimizations for checking intervals for escaping FIG. 16A a diagram of enhanced data structure for storing distances at which high precision iterations are completed.

Figure 16B:
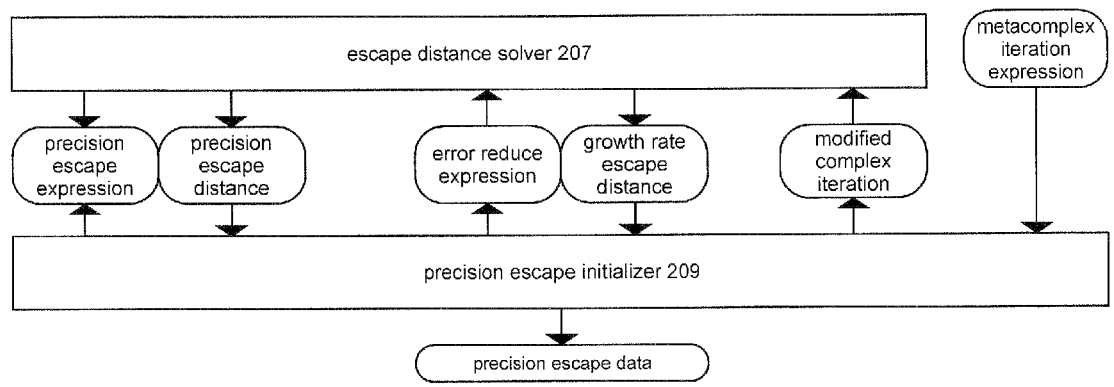
Figure 17:
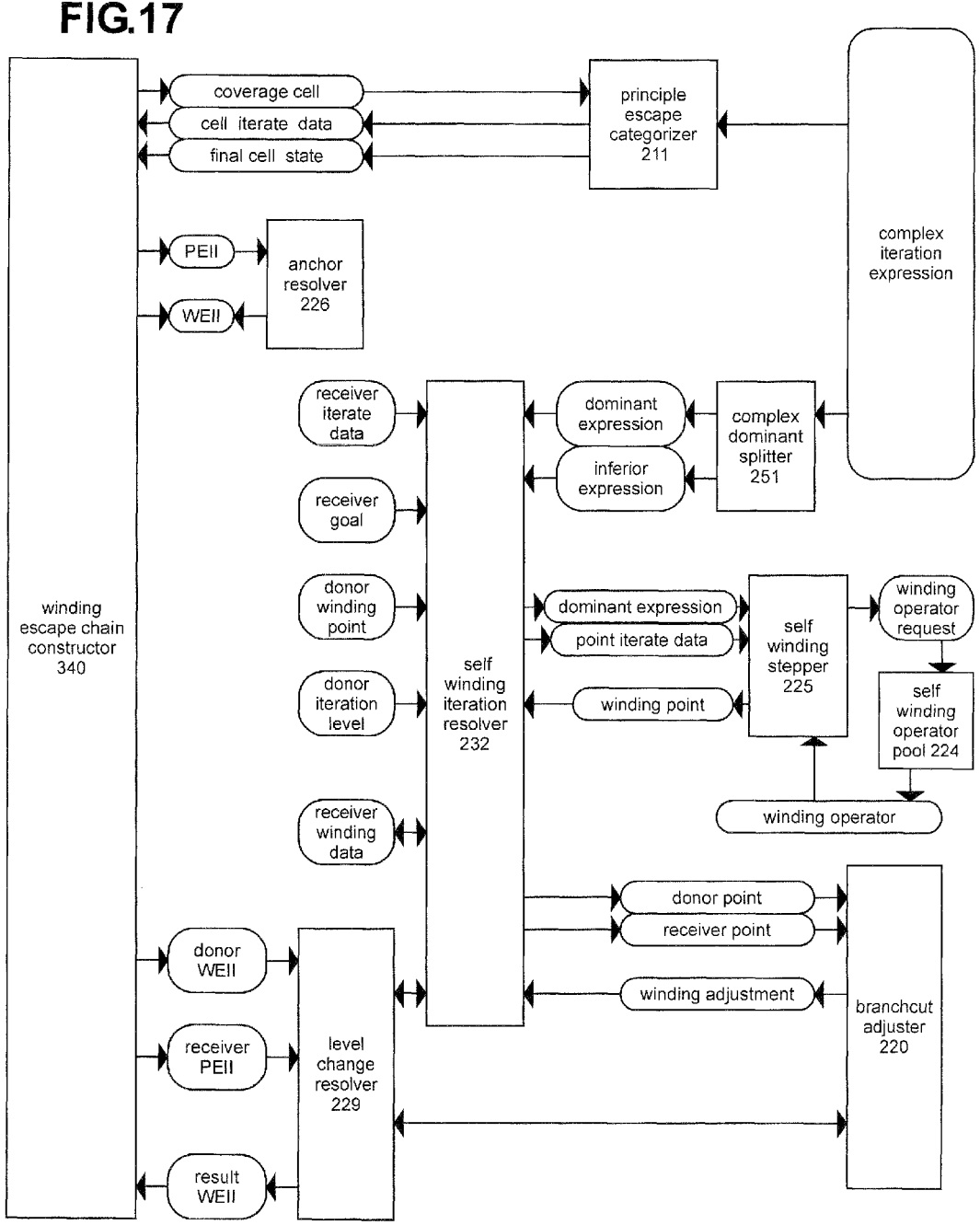
Figure 18:
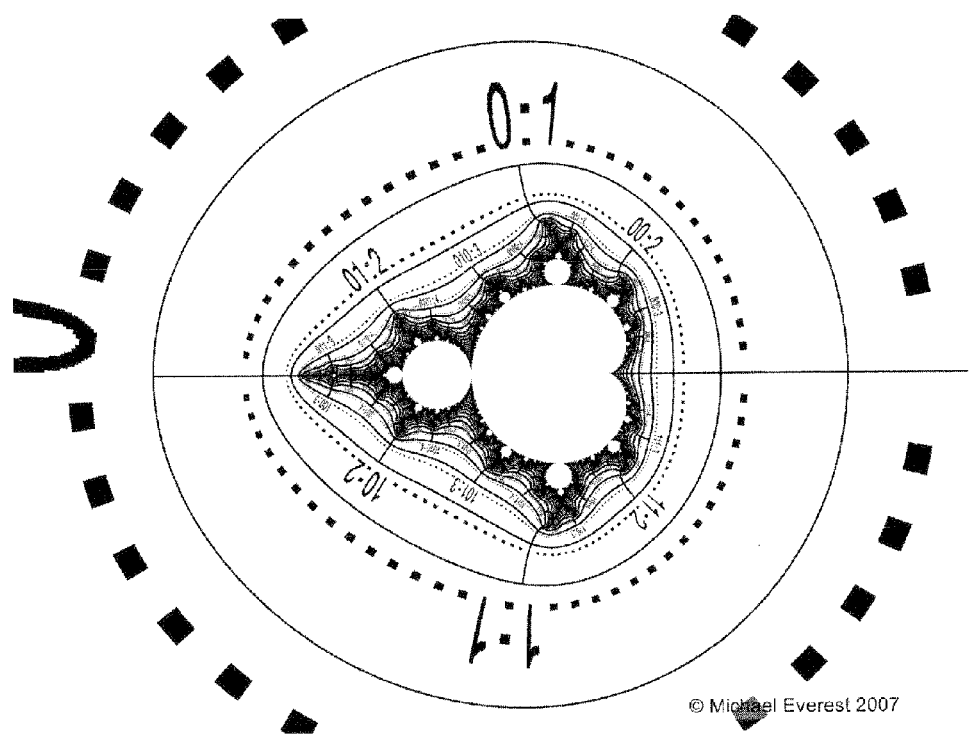

FIG. 16B A diagram for automatic calculation of termination distance for point iterations FIG. 17 A diagram for creation of winding escape chains From This Patent Application:

FIG. 18 is called the Enumerated Decomposition Regions and shows a computer generated image of labeled decomposition regions of the Mandelbrot.

Figure 19:
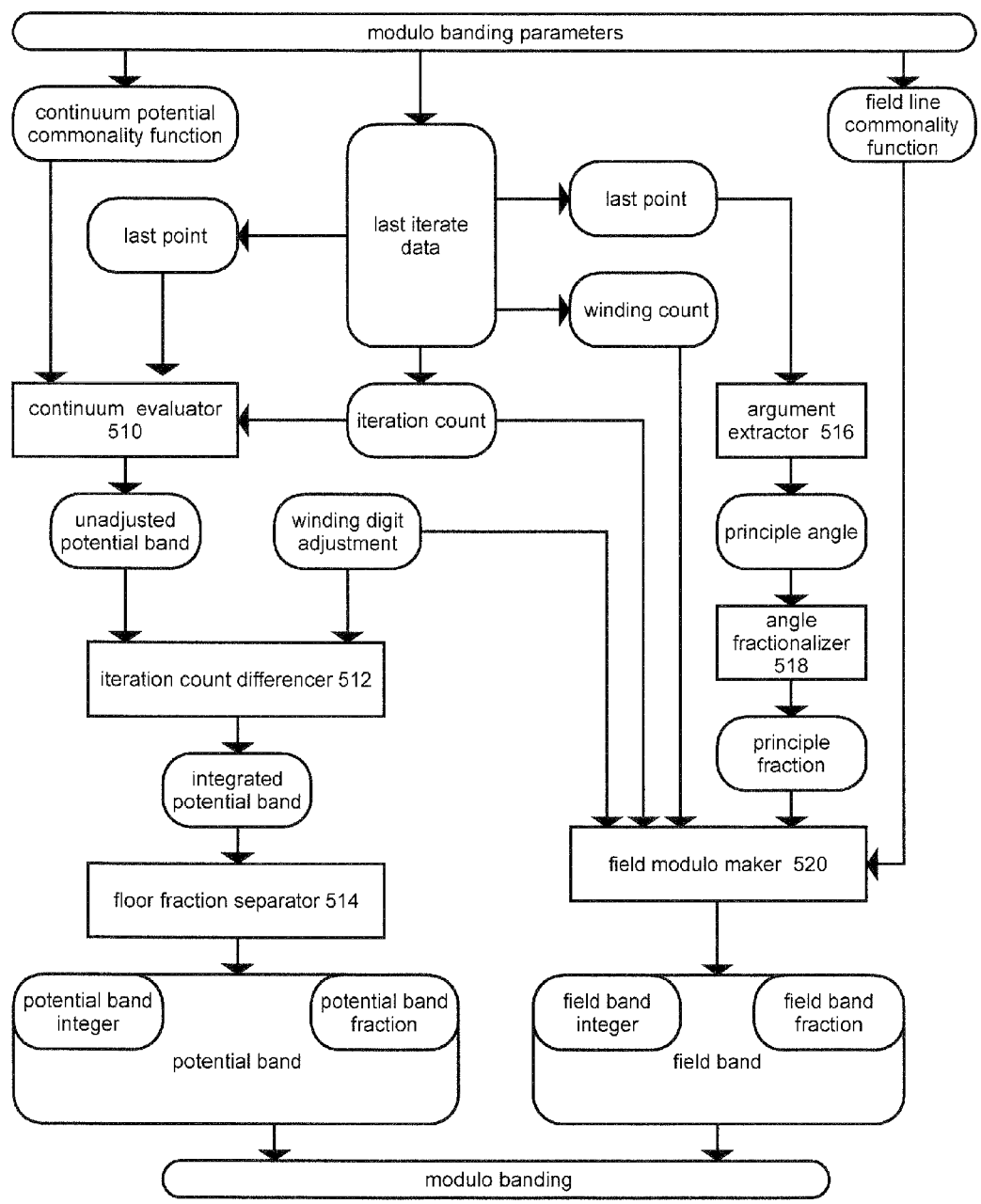

FIG. 19, the Modulo Banding Creator Embodiment, shows the process of creating a modulo banding for a modulo point.

Figure 20:
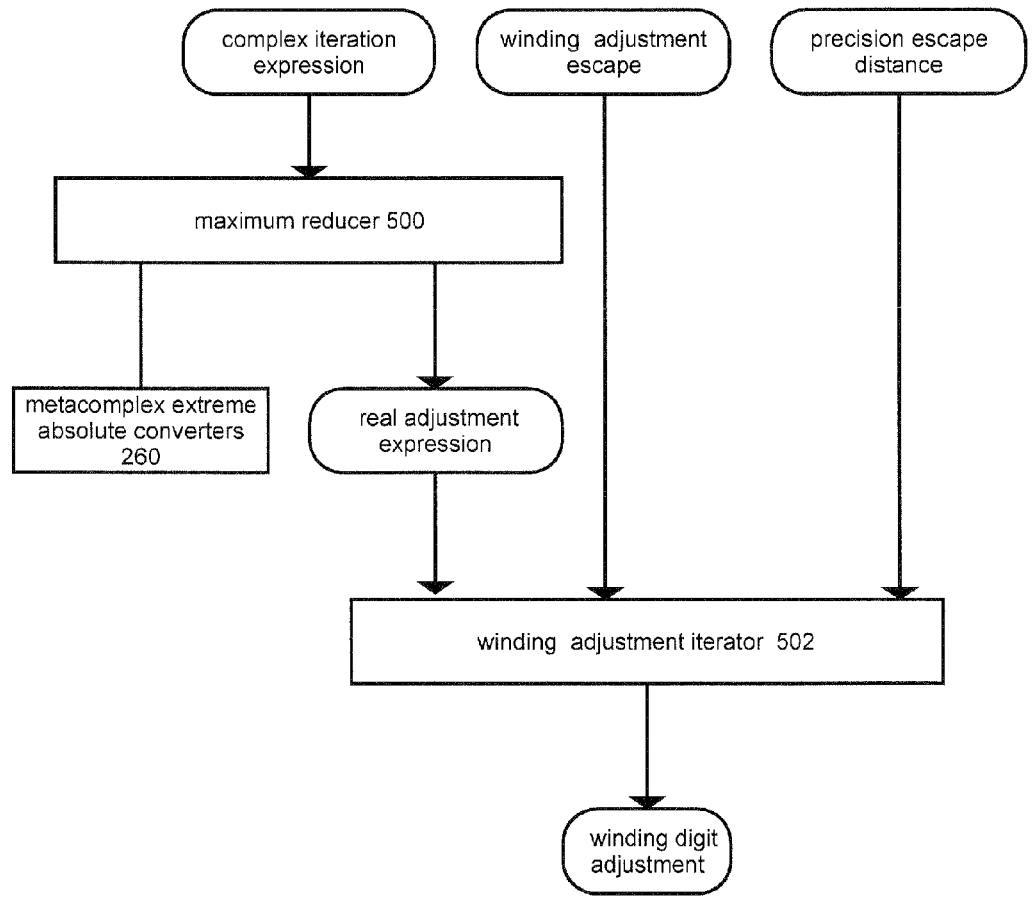

FIG. 20, Winding Digit Adjustment Calculator Embodiment, shows the calculation of the largest winding digit adjustment to increase the decomposition field size without creating any errors in the winding count.

FIG. 21 shows the components for a Full Modulo Iterator Embodiment which is used for self-winding during iteration to produce a modulo point.

FIG. 22 shows the components for an Optimized Modulo Iterator Embodiment which is used for self-winding during iteration to produce a modulo point.

FIG. 23 shows the Codomain Point Resolver Embodiment. This embodiment shows how to resolve a modulo point by donating the winding count from a donor codomain point.

FIG. 24 shows the Same Level Resolve Diagrams to illustrate the logic of assigning winding count adjustments for from a donor codomain point.

FIG. 25: The Traditional Self Resolver Embodiment produces modulo points directly from domain points in a traditional manner without self-winding or a winding digit adjustment. THIS IS PRIOR ART, see introductory material on prior art for this patent application.

FIG. 26: The Self Codomain Resolver Embodiment produces codomain points directly from domain points and incorporates a winding digit adjustment which is non-zero.

FIG. 27: The Traditional Decomposition Interval Embodiment uses traditional derivatives to set the size of a decomposition interval surrounding an iterated point.

FIG. 28: The Modulo Decomposition Interval Embodiment uses traditional derivatives together with self winding to set the size of a decomposition interval surrounding an iterated point FIG. 29: The Codomain Interval Resolver Embodiment creates a codomain decomposition interval from a decomposition quantified interval and a codomain point.

FIG. 30: The Codomain Interval Constructor Embodiment constructs a codomain decomposition interval from a donor codomain point and a nearby domain point.

FIG. 31 shows the Codomain Chain Embodiment, a method for creating a chain of overlapping (or touching) codomain intervals to cover a path or area.

FIG. 32A to FIG. 32E show diagrams illustrating overlapping intervals to help in the description of FIG. 31.

Figures Utilizing Codomain or Interval Processing:

The following figures create technology which can be based in the original prior patent's interval methods or the codomain technology just introduced.

FIG. 33 shows the Generic Anchored Chain Embodiment is a generic method for finding an anchored codomain point and building an interlocking chain.

FIG. 34 shows a Periphery Pathfinder Embodiment finds a path to the outside using periphery points of successive domain intervals.

FIG. 35 shows a Jumper Pathfinder Embodiment, which beginning with any domain point, no matter how deep inside a chaotic function, finds a path to the outside using periphery points of successive domain intervals.

FIG. 36 shows the Path Resolver Embodiment, a method for finding a chain of domain intervals to resolve an arbitrary domain point.

FIG. 37 shows the Buffered Path Resolver Embodiment, a method for finding a chain of domain intervals to resolve an arbitrary domain point and saving the resolved intervals.

FIG. 38 shows the Pixel Center Bitmap Iterator Embodiment for ensuring that all pixels are assigned a codomain value based on iterating the domain point at the center of a pixel.

Figure 39:
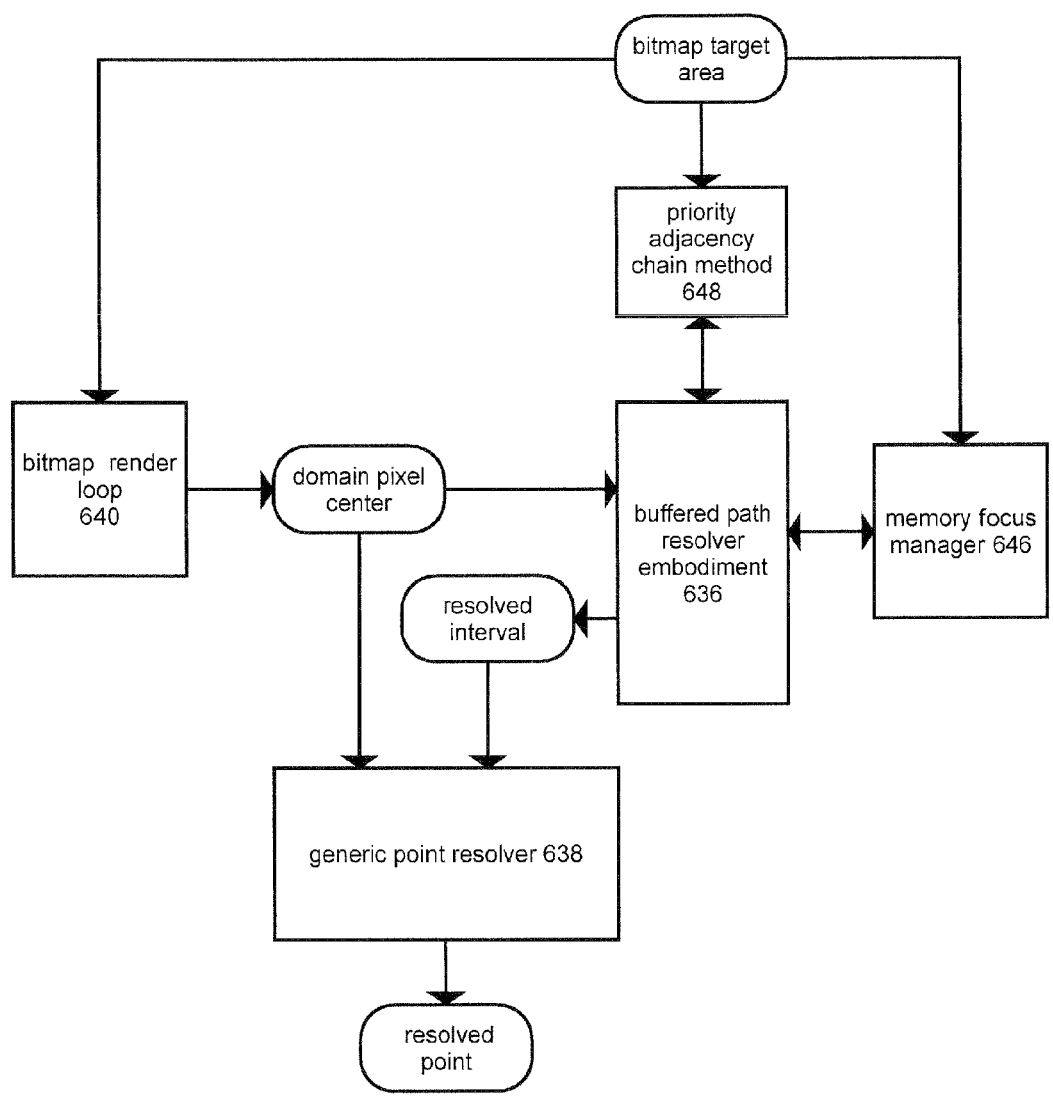

FIG. 39 shows the Hybrid Bitmap Iterator Embodiment incorporating two methods for finding pixel values.

Figure 40:
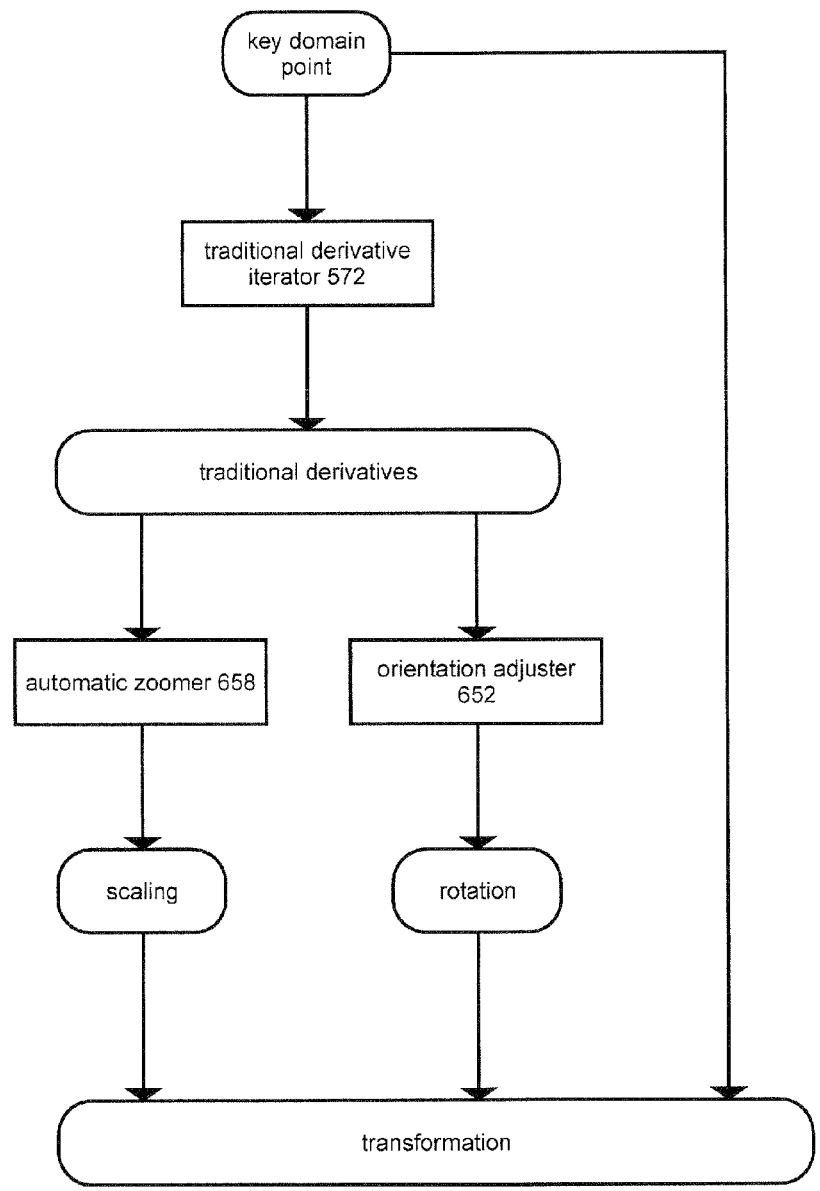

FIG. 40 shows the Automatic Transformer Embodiment which is used to orient and scale a view of the iterated function.

Figure 41:
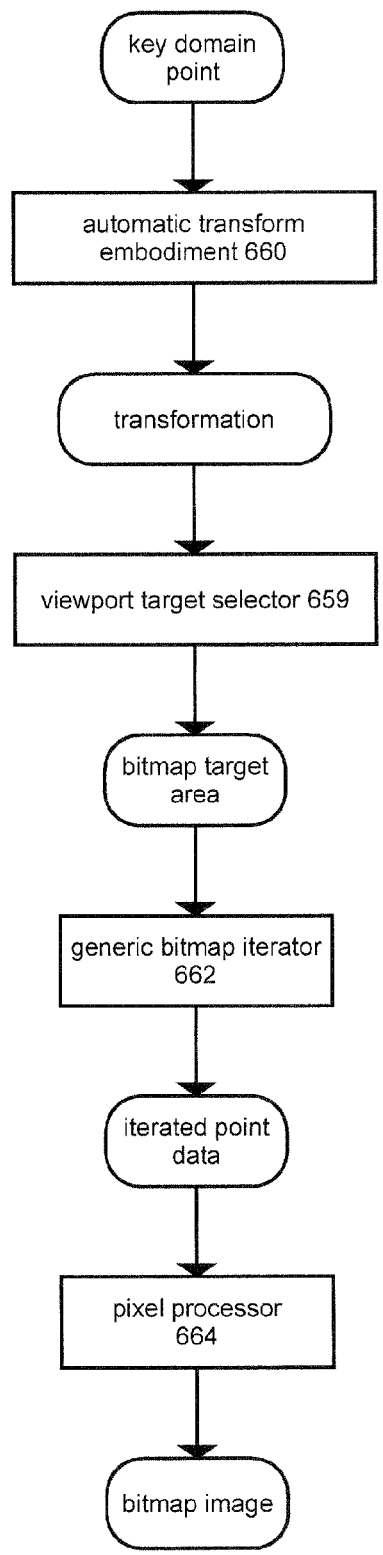

FIG. 41 shows the Generic Visualizer Embodiment: which automatically transforms and draws a full bitmap image.

Figure 42:
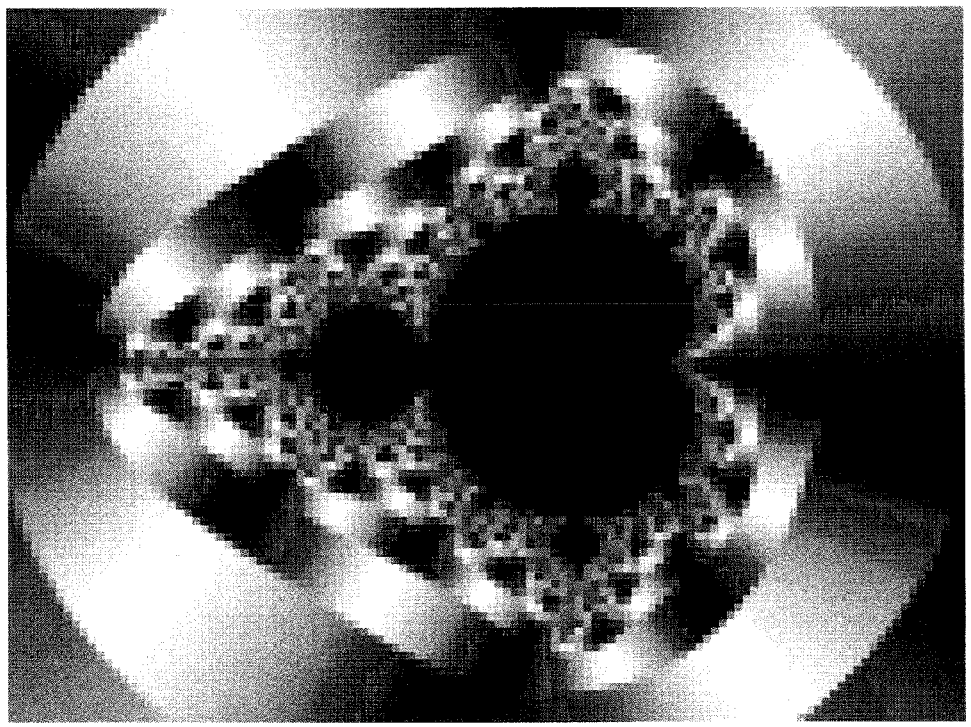

FIG. 42 shows prior art based on Ultra Fractal's coloring of "decomposition".

REFERENCE NUMERALS

From Prior Patent Application:

| | |
|---|---|
| 050 | inclusive metacomplex scalar |
| 052 | inclusive rigid body rotation |
| 054 | inclusive invert operator |
| 056 | unit power operator |
| 058 | zero power operator |
| 060 | optimal inclusive additive operator |
| 062 | inclusive metacomplex shape converter |
| 064 | inclusive metacomplex range |
| 066 | stable inclusive complex multiplication |
| 068 | stable inclusive quaternion multiplication |
| 070 | cubic inclusive quaternion multiplication |
| 072 | inclusive complex contraction power |
| 074 | inclusive hypercomplex contraction power |
| 076 | stable inclusive complex sqrt power |
| 078 | stable inclusive hypercomplex sqrt power |
| 080 | inclusive robust complex expansion power |
| 082 | inclusive hypercomplex expansion power |
| 084 | stable inclusive complex square power |
| 086 | stable inclusive hypercomplex square power |
| 088 | stable inclusive metacomplex three halves power |
| 100 | interval expression sequencer |
| 102 | interval evaluator |
| 104 | interval operator pool |
| 110 | dual evaluator |
| 112 | dual operator pool |
| 114 | dual tester |
| 116 | precision iterator |
| 200 | parametric interval iterator |
| 202 | level iterator |
| 204 | escape categorizer |
| 205 | category escape initializer |
| 206 | indeterminate checker |
| 207 | escape distance solver |
| 208 | cell iterate analyzer |
| 209 | precision escape initializer |
| 210 | cell categorizer |
| 211 | principle escape categorizer |
| 220 | branchcut adjuster |
| 222 | same level resolver |
| 224 | self winding operator pool |
| 225 | self winding dominant stepper |
| 226 | anchor resolver |
| 229 | level change resolver |
| 232 | self winding iteration resolver |
| 250 | dominant splitter |
| 251 | complex dominant splitter |
| 252 | dominant reducer |

-continued

| | |
|---|---|
| 254 | inferior reducer |
| 256 | escape formula replacer |
| 258 | positive real root solver |
| 260 | metacomplex extreme absolute converters |
| 262 | common iterate replacer |
| 264 | escape distance driver |
| 270 | dominant extractor |
| 272 | coefficient power separator |
| 274 | level degree pair correlator |
| 276 | commonality correlator |
| 278 | correlation driver |
| 300 | potential point iterator |
| 302 | commonality function generator |
| 310 | field line point iterator |
| 320 | winding escape sequencer |
| 330 | topological storage manager |
| 340 | winding escape chain constructor |

From This Patent Application:
  500 maximal reducer, see FIG. 20
  502 winding adjustment iterator, see FIG. 20
  504 WINDING DIGIT ADJUSTMENT CALCULATOR EMBODIMENT, is FIG. 20
  510 continuum evaluator, see FIG. 19
  512 iteration count differencer, see FIG. 19
  514 floor fraction separator, see FIG. 19
  516 argument extractor, see FIG. 19
  518 angle fractionalizer, see FIG. 19
  520 field modulo maker, see FIG. 19
  522 MODULO BANDING CREATOR EMBODIMENT, is FIG. 19, see FIG. 21
  530 full modulo resolver, see FIG. 21
  532 FULL MODULO ITERATOR EMBODIMENT, is FIG. 21, see FIG. 22
  534 OPTIMIZED MODULO ITERATOR EMBODIMENT, is FIG. 22
  536 TRADITIONAL MODULO EMBODIMENT, is FIG. 25
  540 traditional iterator, see FIG. 22, see FIG. 25
  542 optimized modulo resolver, see FIG. 22
  550 codomain same level resolver, see FIG. 23
  552 codomain up level resolver, see FIG. 23
  554 codomain down level resolver, see FIG. 23
  556 codomain resolve chooser, see FIG. 23
  558 CODOMAIN POINT RESOLVER EMBODIMENT of FIG. 23, see FIG. 29, FIG. 30
  560 winding digit limiter, see FIG. 26, see generic point resolver (638)
  562 traditional banding, see FIG. 25
  566 SELF CODOMAIN RESOLVER EMBODIMENT, is FIG. 26
  568 TRADITIONAL SELF RESOLVER EMBODIMENT, is FIG. 25
  572 traditional derivative iterator, see FIG. 27, see FIG. 28, FIG. 35, FIG. 40
  574 decomposition interval quantifier, see FIG. 27, see FIG. 28
  576 Traditional Decomposition Interval Embodiment, is FIG. 27
  580 codomain decomposition constructor, see FIG. 29, FIG. 30
  588 modulo resolver method, see FIG. 28,
  590 modulo decomposition modifier, see FIG. 28
  592 Decomposition Interval Method: see FIG. 30
  594 Modulo Codomain Interval Constructor Embodiment: FIG. 30
  596 codomain interval constructor embodiment: is FIG. 30, see FIG. 31

598 Codomain Chain Maker, see FIG. 31
599 Codomain Chain Embodiment is FIG. 31,
604 self resolver method, see FIG. 33, see FIG. 37
    See FIG. 25, Traditional Self Resolver Embodiment (Prior Art)
    See FIG. 26, Self Codomain Resolver Embodiment,
    Also see the component called the anchor resolver (226) of prior patent under FIG. 7,
FIG. 7 Same Level Winding Interval Embodiment
606 generic resolving chain method, see FIG. 33, see FIG. 37
    See Codomain Chain Embodiment (599) of FIG. 31
    See FIG. 17, Winding Chain Embodiment, in the prior patent application.
608 generic anchored chain embodiment is FIG. 33, see FIG. 36, FIG. 37
610 decomposition interval method, see FIG. 34
    See FIG. 27, Traditional Decomposition Interval Embodiment
    See FIG. 29 Modulo Decomposition Interval Embodiment
612 anchor check, see FIG. 34, see FIG. 35
614 periphery point finder, see FIG. 34, see FIG. 35
616 domain path collector, see FIG. 34, see FIG. 35
618 periphery pathfinder embodiment, FIG. 34
620 cell categorizer embodiment, See FIG. 6 of prior patent, also see FIG. 35
622 directional interval initializer, see FIG. 35
624 safe interval looper, see FIG. 35
628 jumper pathfinder embodiment, FIG. 35
630 escape pathfinder method. See FIG. 26
    Typical embodiments include:
        618 periphery pathfinder embodiment, FIG. 34
        628 jumper pathfinder embodiment, FIG. 35
632 buffered escape pathfinder method, see FIG. 37
634 resolved interval buffer, see FIG. 37
636 buffered path resolver embodiment. FIG. 37, see FIG. 38, FIG. 9
638 generic point resolver, see FIG. 38, FIG. 39
640 bitmap render loop, see FIG. 38, FIG. 39
642 Pixel Center Bitmap Iterator Embodiment is FIG. 38.
646 memory focus manager, see FIG. 39
648 priority adjacency chain method, see FIG. 39
650 Hybrid Bitmap Iterator Embodiment is FIG. 39
652 orientation adjuster, FIG. 40
658 automatic zoomer, FIG. 40
659 viewport target selector, see FIG. 41
660 Automatic Transform Embodiment, is FIG. 40, see FIG. 41
662 generic bitmap iterator, see FIG. 41
664 pixel processor, see FIG. 41

DETAILED DESCRIPTION

FIG. 18 Enumeration of Decomposition Regions

FIG. 18 is called the Enumerated Decomposition Regions and shows a computer generated image of labeled decomposition regions of the Mandelbrot. This figure is provided for context and understanding of this patent application. This discussion also provides for terminology used throughout this document.

The image shows solid lines and labels consisting of dotted lines and numerals separated by a colon; these glyphs are texture mapped onto a coordinate system based on potential lines and field lines, where the terms potential lines and field lines are taken from classic discussions of the subject. The solid lines which surround the central image are traditionally called potential lines. Looking carefully, one can also see lines which begin on a potential line and which extend perpendicular to the potential lines towards the boundary of the central image; these lines are called field region lines, which is my terminology. Potential lines and field region lines form a decomposition of the area outside the central figure boundary. Each of the decomposition regions is shaped as a distorted rectangle and bounded by two potential lines and two field region lines. According to classic mathematical iterated function theory, each point outside the central figure can be mapped one-to-one onto a single disc. As will be seen, the decomposition regions are useful in computing this one-to-one mapping. In this vein, each decomposition region has a unique label or enumeration, surrounded by dashes to reinforce the extent of the region.

For efficiency in processing, these regions should be as large as is possible, and important embodiments of this patent are used for this purpose.

Iteration Expressions

An iteration expression is called a complex or metacomplex iteration expression in the prior patent. As described therein, the expression can be separated into a dominant expression and an inferior expression. The dominant expression has an associated iterate power factor, as described in the prior patent application under the description of FIG. 10, coefficient power separator (272). The iterate power factor is easy to find. For example, in the dominant expression $z^{\wedge}p$, ($z$ to the integer power p), the iterate power factor is p. For the Mandelbrot expression, $z^{\wedge}2+z0$, the iterate power factor is 2.

As points external to the inner figure are iterated, as for example, $zNext=zLast^{\wedge}p+ZFirst$, the absolute value of the zNext iterate (complex or metacomplex) eventually reaches a global escape distance. At this distance any iterate (i.e. globally for all points) will eventually keep iterating to larger and larger values until a precision escape distance is reached, and iterations are stopped. The precision escape count is the number of iterations to just achieve the specified precision escape distance.

Potential Band, Potential Band Integer

The labels in FIG. 18 are in the format of DDD:B. The "B" value is typically provided in decimal format and is indicative of the precision escape count. The B value is equal to this precision escape count minus a winding digit adjustment which is a zero or positive integer. The result is called the potential band. Therefore, all points in the same potential band escape to the precision escape distance in an iteration count equal to the "B" value plus the winding digit adjustment. As will be seen later, the winding digit adjustment is important in the goal of obtaining large decomposition regions. For example, in the generation of FIG. 18, the winding digit adjustment was 4. The top label "0:1" has a potential band value of "1", which implies that each point in that potential band must escape in exactly 1+4 iterations. There is also a potential band of 1 on the bottom of FIG. 18, labeled "1:1". Notice that each successive potential band divides into exactly 2 new potential band regions at the next higher potential band. Therefore the potential bands for B=3 is equal to $2^{\wedge}3$ which equals 8. Lower potential bands of 0, −1, −2, are not divided into separate regions. Note that when the iterate power factor is the generic "p", this subdivision is into "p" regions. For example for iteration expression "$z^{\wedge}4+z0$", the potential band of "3" has $4^{\wedge}3$ or 64 regions.

The potential band can be identified as simply the "B" value of a potential band. This is also called the potential band integer.

Potential Band Fraction

In mathematics, continuous functions are useful, particularly when taking derivatives. But how are we to associate fractional values to increasing potential values in a potential band? A continuous change from the potential line at the outer side of the potential band to the potential line on the inner side of a potential band is needed.

A fraction ranging from zero to one is associated with each point in a potential band, and is called the potential band fraction. The fraction indicates the transition from the outer potential line (a zero fraction which underflows to the boundary of the next outer potential band) to the next inner potential line (a fraction of 1 which overflows to the next potential band).

To achieve continuity between each potential band, a continuous function indicating the amount of transversal is needed. This number can be calculated in a variety of ways, but an elegant formal mathematical method is proposed here: take the negated value of the real logarithm, base p, of the result for the potential value; and then assign the integer and fractional parts to be the potential band integer and potential band fraction, respectively. Ideally, the integer part must retain its direct association with the precision escape count.

Field Bands: Integer and Fraction, Field Line

The labels in FIG. 18 are in the format of DDD:B. The "D" values are digits in the base of p, where p is the iterate power factor. Notice that the number of digits correlates exactly to the potential band integer. For example, if the potential band integer is 4, we have "DDDD:4", with 4 digits of "DDDD". Higher order digits, which may occur as an artifact of iteration, are discarded. Note that on each potential band, for each successive decomposition region taken in counter-clockwise rotation, the DDD number increments by one. This approach, in my terminology, is called positive branchcut field banding, because, of the discontinuity on the positive real axis. Other methods are possible. Consider p=2, with the high order digit sign extended as a two's complement number; in this case, the branchcut will occur on the negative real axis. All such methods represent the same underlying data, and this document will use the positive branchcut field banding to assign digits and eliminate sign extensions.

The actual field band is calculated in several steps. First the winding count is computed as described in the prior patent. Then a signed fraction is computed as the complex argument of the final iteration (the same as the principle part of the imaginary part of the complex logarithm of the final iteration) and is divided by 2 times Pi, resulting in a fraction between −0.5 and 0.5. The fraction is added to the integer winding count and divided by p raised to the power specified by the winding digit adjustment. The mathematical floor function is used to extract the integer part, which becomes the field band integer, and the remaining fraction is the field band fraction. However, don't forget to chop off the excess high order digits of the field band integer, as described above.

Field lines/Potentials versus Banding

Although the author finds it convenient to use field bands and potential bands to implement algorithms and describe methods, the traditional use of field lines and potentials as described in classic literature are mathematically equivalent in that there is a one-to-one mapping between each formulization. The previous patent emphasized the classic approach. However, because this patent uses the decomposition regions as a basis for algorithms, the banding approach is the approach judged best for this description.

Domain/Codomain

The term "domain", as in domain interval or domain point refers to complex intervals and points used as the start of iteration. The codomain intervals and codomain points refer to the final iteration values, which are usually expressed by field band values and potential band values. However, in some embodiments where implementations may use forms from the prior patent, then the codomain values may actually be referencing potentials and field lines. But since these two systems are equivalent, the resulting ambiguity should disappear once an implementation is chosen.

Special Point Values

This document uses several point types representing the results of iteration. In the following descriptions, the integers of an iteration count and a potential band differ only by the integral winding digit adjustment. Because a winding digit adjustment, once set, is constant, the iteration count and potential band are equivalent and the redundancy can be removed by eliminating one of them. However, for clarity, they are both specified.

Modulo Point:

Iteration Count: this is the number of steps to iterate the domain point to obtain an absolute value equal to at least the precision escape distance.

Field Band Fraction: the field band fraction is constructed from both the complex Argument function applied to the last complex iterate and to the low order digits of the winding count.

Field band integer: for a modulo point, the field band integer is undefined or contains errors. In systems wishing to save space at the expense of a new data structure, a modulo point can be devoid of the field band integer. However for simplicity and clarity in this document, the field band integer is kept available.

Potential Band data: always computed.

Traditional Point:

Description: the traditional method of iterating does not compute any correct digits for winding count. However, it can contain the same correct values as a modulo point whenever the winding digit adjustment is zero! Thus, the traditional point can become a modulo point when the winding digit adjustment is zero.

Codomain Point: Contains:

Description: the codomain point contains all information for constructing field lines, potentials, or the field band and potential bands described in this document. In essence, it is a modulo point which includes a field band integer.

FIG. 19: Modulo Banding Creator Embodiment

FIG. 19, the Modulo Banding Creator Embodiment, shows the process of creating the modulo banding for a modulo point. The steps of this process were briefly discussed in the discussion of FIG. 18.

Inputs:

The input parameters for this embodiment are shown near the top and center-top of FIG. 19. The term called modulo banding parameters encompasses all of the following parameters, as indicated by rounded corner rectangles in FIG. 19.

Continuum potential commonality function: this function is the same as that described in the prior patent for a potential commonality function, except here, the integer portion of the result is correlated to the escape iteration count. The most obvious choice is to take an additional real logarithm with base "p" is applied to the potential, where "p" is the iterate power factor. Refer to the description of the commonality correlator (276) in FIG. 10, for details in the prior patent application.

Field line commonality function: refer to the description of the commonality correlator (276) in FIG. 10, for details in its construction.

Winding digit adjustment: this is usually a constant small integer to control digit shifting, as described for FIG. 18. Also see FIG. 20 for automatic calculation of this value.

Last iterate data: this data is obtained from the iteration of a point. The last point is simply the iterated value when the absolute value of the iterated value reaches the precision escape distance. The winding count is the accumulated winding count. The winding count may have errors in high order digits, provided that these digits are beyond the digit specified by the winding digit adjustment. Finally, the iteration count is simply the number of iterations to reach the precision escape distance.

Outputs:

Modulo banding: this is the potential banding and field band fraction.

Components:

Continuum Evaluator (510):

See prior patent for a discussion of the potential function. This component, as shown in FIG. 19 on the middle left of the diagram, produces a real valued expression in a single variable called the unadjusted potential band. For dominant expressions of the form "z^p", the continuum evaluator (510) can be as simple as taking the real logarithm of the potential function, base "p". Consider. For the dominant expression of z^p, the potential, in both the prior patent and classic literature, is given by Log [Abs[zLast]]/p^n, where n is the iteration steps, p is the iterate power factor, and zLast is the last iterate value. Also, Log [p,expr] represents the real logarithm, base p, of the positive real expression expr. By taking the negation of the real logarithm, of that potential, base p, we have −Log [p,Log [Abs[zLast]]+n−wda, where wda is the winding digit adjustment. The integer part, the potential band integer, is taken as the mathematical "Floor" function, and the remaining positive part is the potential band fraction.

However, in the potential commonality function includes other factors, such "c" in the expression "c*z^p", where c is a constant, then the potential function should be altered: refer to the prior patent. In this case, the input expression, called the continuum potential commonality function, is altered so that each successively higher iteration, n, the number of iteration steps to reach the precision escape distance, produces a potential band integer of 1 greater.

Iteration count differencer (512): This component simply subtracts the winding digit adjustment, an integer, from the unadjusted potential band, as shown in FIG. 19. The result is called the integrated potential band because it contains both the integer and fractional parts. If the winding digit adjustment is known to always be zero, then this component is null, and the unadjusted potential band becomes the integrated potential band.

Floor fraction separator (514): This component can be null when the fraction and integer parts of the potential band are stored as a single value. Otherwise, the mathematical Floor function is used to extract the integer part and the fraction is the leftover value.

Argument extractor (516): this component takes the last point of the iteration and determines the principle argument angle as a value within the interval of (−Pi, Pi].

Angle fractionalizer (518): this component divides the principle angle by 2 Pi, to convert the angle to value in the interval of (−0.5 to 0.5].

Field modulo maker (520): this component takes the winding count, iteration count, and winding digit adjustment, field line commonality function, together with the principle fraction, to create the field band. The fraction is added to the integer winding count and divided by p raised to the power specified by the winding digit adjustment. The mathematical floor function is used to extract the integer part, which becomes the field band integer, and the remaining fraction is the field band fraction. However, don't forget to chop off the excess high order digits of the field band integer, as described above. The field band integer may not always be correct, and therefore the resulting point is usually referenced as a modulo point and not a codomain point.

Operation:

Processing proceeds from top to bottom along two separate paths, one for the potential band and one for the field band; the results are typically combined as a single data structure.

FIG. 20: Winding Digit Adjustment Calculator Embodiment

FIG. 20, Winding Digit Adjustment Calculator Embodiment, shows the calculation of the largest winding digit adjustment to increase the decomposition field size without creating any errors in the winding count.

Inputs:

Complex iteration expression: this was described data in the prior patent application when discussing FIG. 5.

Precision escape distance: this distance is the minimum escape distance to ensure high precision of a chaotic iteration. General purpose algorithms to find this value are found in the prior patent application.

Winding adjustment escape: this is the distance to begin an iteration to find a winding digit adjustment. The global escape distance is a good choice. For algorithms to calculate the global escape distance, refer to the prior patent application.

Outputs:

Winding digit adjustment: this is a small integer. For example, 4.

Components:

Maximal reducer (500): See the description of the inferior reducer (254) in the prior patent application. The maximal reducer (500) is the same as the inferior reducer (254); in this application the complex iteration expression is used as input, instead of the inferior expression, as described in the prior patent application.

Metacomplex extreme absolute converters (260): See prior patent application. This component is a library of routines to support the inferior reducer (254); that is, in this case, the maximal reducer (500).

Winding adjustment iterator (502): The winding adjustment iterator (502) counts the number of iterations obtained by starting with the winding adjustment escape (see inputs, above) and iterating the real adjustment expression. The incremental counting stops just before iteration exceeds the precision escape distance. The result of this process is the winding digit adjustment.

Operation:

First the complex iteration expression is passed to the maximal reducer (500) to create the real adjustment expression. Then, the winding adjustment iterator (502) is called to count the number of steps to produce the winding digit adjustment while using the real adjustment expression for each iteration of the variable.

FIG. 21: Full Modulo Embodiment

FIG. 21 shows the components for a Full Modulo Embodiment which is used for self-winding during iteration to produce a modulo point. Most of these components were described in the prior patent application. In that patent application, winding of the self-winding dominant stepper (225) was initiated from an enclosing interval, called a WEIl Please refer to the prior patent application, FIG. 8, concerning the self winding iteration resolver (232). Here, instead of a WEIl donating a winding and an interval center, the winding count is initialized to zero to begin the self winding iteration.

Otherwise, the description of FIG. 21 is similar to FIG. 8, with the addition of the modulo banding embodiment (522) at the bottom of FIG. 21 and the replacement of the self winding iteration resolver (232) by the full modulo resolver (530).

The full modulo embodiment of FIG. 21 accumulates a winding count during iteration, based on the input of the point iterate data and point iterate goal, described in the previous patent application. The output is called a modulo point, which includes the final iteration point and the winding count. For very large iterations, for example 1000 steps, the resulting winding count might need an integer capable of holding 2^1000 winding counts, or generally p^1000. And, this may indeed be useful for any iteration that produces the correct, or almost correct, full winding count. However, as described above, in "ENUMERATED DECOMPOSITION: FIG. 18", only a small number of digits of the winding count are usually used for a modulo point. In particular, when the winding count adjustment is four for a binary decomposition, then only four (binary) digits are required.

Inputs:

Point Iterate Data: this is discussed in the prior patent, but is simply a specification of the known iteration data, such as the starting domain point.

Point Iterate Goal: this is discussed in the prior patent, but is merely the goal to determine when to stop iterating. Typically, the precision escape distance is used.

Winding digit adjustment: this is a small integer. Refer to FIG. 20, Winding Digit Adjustment Calculator embodiment, for details on its automatic calculation.

Outputs:

Modulo point: this is the output point. Refer to introductory material described under FIG. 18, Enumeration of Decomposition Regions.

Components:

Modulo Banding Creator Embodiment (522)

The modulo banding creator embodiment (522) is the embodiment described in FIG. 19.

Full Modulo Resolver (530)

A full modulo resolver (530) passes the point iterate data (current iteration position) together with the dominant expression to the self winding dominant stepper (225) in order to update the winding count and point iterate data. An initial winding count, for the starting the iteration, is set to zero. (Note that the point iterate data may already include some iteration steps; this is useful for the next embodiment, the Optimized Modulo Embodiment of FIG. 22).

The self winding dominant stepper (225) is called for each evaluation of the dominant expression of the iteration to apply winding operators.

The second part of each iteration step, processing the inferior expression, is done in two parts—just as in the self winding iteration resolver (232). First a principle value (i.e. no winding count) is calculated for the inferior expression; this principle value is added to the principle part of the current result of the dominant expression, and the branchcut adjuster (220) is called to determine if the this final value is passed forward or reversed across the branchcut on the negative real axis. The final value for each iteration step is constructed by taking the receiver point and assigning it the winding count of the donor point plus the adjustment. This newly constructed point is the input for the next step of the iteration process.

Iteration stops when the point iterate goal is met, such as achieving the precision escape distance. The result is a winding point which meets the point iterate goal.

Operation:

The full modulo resolver (530) first accepts the dominant and inferior expressions from the complex dominant splitter (251). The full modulo resolver (530) performs a self winding iteration to produce a winding point. This winding point is used to construct the last iterate data as part of the modulo banding parameters. The other two parameters for the modulo banding parameters are the continuum potential commonality function and the field line commonality function; both are usually predetermined when an iteration expression is designated.

The last step is to pass the modulo banding parameters to the modulo banding creator embodiment (522) in order to create the modulo point. This last output, the modulo point, is returned as the output of this embodiment of FIG. 21.

FIG. 22: Optimized Modulo Embodiment:

FIG. 22 shows the components for a Optimized Modulo Embodiment which is used for self-winding during iteration to produce a modulo point. In both the prior patent, and now here, it is sometimes useful to use traditional iteration technology for part of the iteration, and then switch to an iteration technology incorporating self-winding.

Inputs:

Point Iterate Data: this is discussed in the prior patent, but is simply a specification of the known iteration data, such as the starting domain point.

Point Iterate Goal: this is discussed in the prior patent, but is merely the goal to determine when to stop iterating. Typically, the precision escape distance is used.

Winding digit adjustment: this is a small integer. Refer to FIG. 20, Winding Digit Adjustment Calculator embodiment, for details on its automatic calculation.

Outputs:

Modulo point: this is the output point. Refer to introductory material described under FIG. 18, Enumeration of Decomposition Regions.

Components:

Traditional iterator (540): A traditional iterator (540) iterates an iteration point based on the complex iteration expression until the escape distance is achieved. That is, it uses standard arithmetic to find the next iterate without concern for winding. The traditional result is the next point iterate.

Full modulo embodiment (532): A full modulo embodiment (532) was described in the previous section for FIG. 21.

Optimized modulo resolver (542): An optimized modulo method (542) uses its parameters to specify a domain start point for iteration and an escape distance to terminate iteration. These two data objects are passed to a traditional iterator (540) which performs a traditional iteration until the escape distance is achieved. The tradition result is returned to this component.

Typically the escape distance which is passed to the traditional iterator (540), is the global escape distance (see prior patent), but could also be the precision escape distance. The global escape distance is small enough that enough steps, i.e. at "winding digit adjustment" steps, remain to be iterated.

With this new iterate point value, two parameters are constructed for the full modulo embodiment (532). The modified point iterate data is constructed from the original point iterate data and uses the iterate from the previous action as the starting point. The original point iterate goal is used to construct the winding point iterate goal. The winding point iterate goal is typically the precision escape distance. Finally the full modulo embodiment (532) is called to perform the self winding of the last few steps.

In summary, this optimization uses self winding on the last few iterations, and not on the thousands of iterations before achieving the escape distance.

Operation:

The optimized modulo resolver (542) accepts the input parameters and begins the process by iterating using the traditional iterator (540). Upon completion, the full modulo iterator embodiment (532) is called upon to complete the iteration and eject the modulo point.

FIG. 23-FIG. 24: Codomain Point Resolver Embodiment

FIG. 23 shows the codomain point resolver embodiment. This embodiment shows how to resolve a modulo point by donating the winding count from a donor codomain point. This can be described as a process to disambiguate the decomposition region of the modulo point so that the correct field band integer can be assigned.

On the top left side of the FIG. 23, two inputs are shown: a modulo point and a donor codomain point. On the top of the FIG. 23, three parts of the modulo point are passed directly to the final result, the receiver codomain point. The first of these three parts is the modulo potential band. This consists of a potential band fraction and potential band integer. Although this potential band does not take part in the algorithm, it should be noted that this potential band intrinsically specifies the iteration count, which is used. The second value, the modulo iteration count, is also passed to the output, but it is also used in the algorithm. The third value is also passed unchanged to the result, but is used in the algorithm.

The result of processing by this embodiment is the creation of a receiver codomain point, which is identical to the modulo point used as input with the addition of a correct field band integer.

Inputs:
Donor Codomain Point: a previously computed codomain point which is fully resolved in that it has an accurate field band integer.

Modulo Point: a modulo point which needs the correct field band integer in order to become a codomain point.

Outputs:
Receiver Codomain Point: this is the input modulo point converted to an output point with a correctly computed field band integer.

Components:
Codomain same level resolver (550): the codomain same level resolver (550) is used when the two points (modulo point and donor codomain point) iterate to the precision escape distance in the same number of counts. The assumption is that they are so close together that they are in the same or adjacent decomposition regions. Actually, they need to be closer than that; their field band (integer+fraction) should not differ by more than 5. The result of processing is a winding count that differs by no more than 1 from the donor field band integer extracted from the donor codomain point. The resulting winding count is donated to the result, called the receiver codomain point.

The following simple C++ code uses simple language features, and should be readable by programmers familiar with modern programming languages. The "double" type stores floating point numbers and the Winding number is a type used to store winding counts, which are integers.

```
static void CodomainSameLevelResolver(
    double donorFieldFraction,
    WindingNumber &donorWinding,
    double receiverFieldFraction,
    WindingNumber &receiverWinding) // return value
{
    double fractionalDifference=
        (donorFieldFraction-receiverFieldFraction);
    if (fractionalDifference==0.0)
        receiverWinding=donorWinding;
    else
    if (fractionalDifference>0.0)
    {
        // the donorKP APPEARS
        // greater than the receiver
        if (fractionalDifference<.5) {
            // indeed, the donor is slightly larger
            receiverWinding=donorWinding; // "A"
        } else {
            // because the difference is great, donor
            // is best described as lower.
            receiverWinding=donorWinding+1; // "B"
        }
    }
    else
    {
        // Otherwise the donor
        // APPEARS less than receiver.
        if ((-fractionalDifference)<.5)
        {
            // donor is slightly smaller, but same region
            receiverWinding=donorWinding; "C"
        }
        else
        {
            // the difference is great,
            //   therefore the receiver
            // is best described as lower.
            receiverWinding=donorWinding-1; "D"
        }
    }};
```

Notice that after each assignment of the receiverWinding, there is a comment to indicate "A", "B", "C" or "D". These letters correlate to the cases in FIG. 23A, FIG. 23B, FIG. 23C, and FIG. 23D. Associated with each label, there is a 0, +1 or −1 to indicate the relationship of the receiver winding count, as compared to the donor's winding count. Each of these FIGS. indicates three adjacent decomposition regions having the same iteration count. From left-to-right, each rectangle has one less winding. The "D" value indicates the location of the donor. The "R" value appears in each of the three rectangles and represents the same point, but until processing occurs, we just don't know which are is the real R and which of the R's are phantoms. The "R" value with a square indicates that it is the true "R" value, and the other "R" values are not correct. The true R value is the one closest to the donor.

Codomain up level resolver (552): The codomain up level resolver (552) is used when the modulo point's iteration count is one greater than that of the donor's iteration count. To properly correlate the field band from the donor to the receiver's field band, the donor's field band must reflect the higher iteration count. First combine the field band integer the fraction to form a single number, then multiple by "p", where "p" is the exponent power of the highest term of the dominant expression, then separate the new integer and fractional parts. In the case of the Mandelbrot and Julia sets, the value of p is, of course, 2. These new donor values are then passed to the same codomain same level resolver (550), described above. For example, here is the code for the case when p=2.

```
newDonorFieldFraction =
    donorFieldFraction*2.0;
bool addOne=
    newDonorFieldFraction>=1.0;
newDonorWinding= donorWinding<<1;
```

```
if (addOne)
{
  newDonorWinding++;
  newDonorFieldFraction-=1.0;
}
CodomainSameLevelResolve(
  newDonorFieldFraction, newDonorWinding,
  receiverFieldFraction, receiverWinding);
```

The above code uses shifting of integer bits in order to multiply by 2; for other values of p, this trick may not be available, and an actual multiply might be necessary. The above method is used when the dominant expression is $z\hat{\,}p$, for other types dominant expressions the donor winding is delivered so that there is a continuity of all values as the transition across different escape iteration counts are encountered.

Codomain down level resolver (554): the codomain down level resolver (554) is used when the modulo point's iteration count is one less than that of the donor's iteration count. To properly correlate the field band from the donor to the receiver's field band, the donor's field band must reflect the lower iteration count of the receiver. First combine the donor field band integer and the donor fraction to form a single number (if not yet done), then divide by "p", where "p" is the exponent power of the highest term of the dominant expression, then separate the new integer and fractional parts. In the case of the Mandelbrot and Julia sets, the value of p is, of course, 2, and arithmetic shifting can be used. These new donor values are then passed to the same codomain same level resolver (550), described above.

```
newDonorFieldFraction = donorFieldFraction*.5;
bool addOne= donorWinding&1;
newDonorWinding= donorWinding>>1;
if (addOne)
  newDonorFieldFraction+=.5;
CodomainSameLevelResolve(
  newDonorFieldFraction, newDonorWinding,
  receiverFieldFraction, receiverWinding);
```

The above code uses shifting of integer bits in order to divide by 2; for other values of p, this type of trick may not be available, and an actual divide might be necessary.

The above method is used when the dominant expression is $z\hat{\,}p$, other types of dominant expressions will require that the donor winding is delivered so that there is a continuity of all values as the transition across different escape iteration counts are encountered.

Codomain resolve chooser (556): the codomain resolve chooser compares the iteration counts of the modulo point and the donor codomain point. Based on the comparison, another component is chosen. Parameters are prepared for this selected component using the data from the two input points, and the selected component is called. The comparison choice for processing is given by:

If the modulo iteration count equals the donor iteration count, then the codomain same level resolver (550) is called.

If the modulo iteration count is greater than the donor iteration count, then the codomain up level resolver (552) is called.

If the modulo iteration count is less than the donor iteration count, then the codomain down level resolver (554) is called.

Operations:

In FIG. 23, the action is simple. The receiver codomain point is loaded with all point values except for the receiver field band integer. The codomain resolve chooser (556) uses the iteration counts of the two input points to choose which of the three components to call; the parameters are made ready and the call is made, and the resulting field band integer is stored into the receiver codomain point.

The receiver codomain point can simply be the original modulo point, and then the embodiment merely loads the created field band integer into the original modulo point; in such a case there is no need to copy the other fields of the modulo point into the receiver codomain point because they are one and the same.

FIG. 25: Traditional Self Resolver Embodiment (Prior Art)

FIG. 25: The Traditional Self Resolver produces modulo points directly from domain points in a traditional manner without self-winding or a winding digit adjustment. This is prior art, see introductory material on prior art for this patent application.

Inputs:

Domain start point: this is a domain point to begin iteration.

Escape Distance: a distance to achieve to signal the end of the iteration—see bail out in the prior art discussion in the introductory material. Outputs:

Codomain or Modulo Point: this is the resulting point, which can be interpreted as a codomain or modulo point depending upon the starting point. Note that if the escape distance is very small, then there will be discontinuities across boundaries of differing escape iteration counts.

Components:

Traditional Iterator (540)

A traditional iterator (540) iterates an iteration point based on the original complex iteration expression. This individual component is prior art.

Traditional Banding (562)

Banding consists of two parts: potential banding and field banding. This component, traditional banding (562), is a watered-down version of FIG. 19, Modulo Banding Embodiment. Because there is no self-winding, there is also no winding digit adjustment.

For the field band fraction, the argument angle of the last iterate (–Pi, PI] is converted into a fraction by dividing by 2*Pi, and 0.5 is then added to produce a fraction between 0 and 1. In this form, there is no way to calculate a field band integer, and it is undefined.

For the potential band integer, the escape iteration count is utilized. For the potential band fraction, any method measuring the distance by which a point exceeds the escape distance, can be used to assign a fractional, but the use of a real logarithm base p, is simple and clean, and as seen in FIG. 18.

Note that I have not seen prior art which uses the real logarithm base p to create smooth continuity across each specific potential band.

Thus, this embodiment, works similarly to the Full Modulo Iterator Embodiment of FIG. 21 or the Optimized Modulo Iterator Embodiment of FIG. 22, but its implementation and operation just by happenstance is present in the prior art.

Note: This components creates a potential banding and field banding for a domain point beyond the global escape distance. However, an escape distance very much larger than the global escape distance is required for the appearance of continuity across potential bands (as is true for any method). However, because there is no self winding or winding digit adjustment, a higher escape distance implies smaller decomposition regions.

But how can starting from domain points produce correct field band integers (winding counts) when there is no self winding? The answer is that decomposition regions for points which require zero iteration will also have a zero winding count.

For other domain points below the escape distance, where at least one iteration is required, the result can serve as a modulo point.

FIG. 26: Self Codomain Resolver Embodiment

FIG. 26: The Self Codomain Resolver produces codomain points directly from domain points and incorporates a winding digit adjustment which may be non-zero.

Inputs:

Point Iterate Data: this is discussed in the prior patent, but is simply a specification of the known iteration data, such as the starting domain point.

Point Iterate Goal: this is discussed in the prior patent, but is merely the goal to determine when to stop iterating. Typically, the precision escape distance is used.

Winding digit adjustment: this is a small integer. Refer to FIG. 20, Winding Digit Adjustment Calculator embodiment, for details on its automatic calculation.

Outputs:

Codomain point: this is the output point. Refer to introductory material described under FIG. 18, Enumeration of Decomposition Regions.

Components:

Extended Modulo Embodiment (534)

This component is the full embodiment of FIG. 21, Full Modulo Embodiment, but with the proviso that all digits of the winding count are preserved during the self winding process.

Winding Digit Limiter (560) [Optional]

This component strips high order digits base "p" from the field band integer. All digits beyond the count specified by the winding digit adjustment are removed. However, in practice, there is only one way to have extra digits, and that is through negative winding counts which are really a simple sign extension. The winding digit limiter (560) is of more use when some of the winding count digits are donated; this usage is described later.

Note:

Warning, the output codomain point is appears to almost certainly contain errors for some points in the Mandelbrot and some types of Julia sets, perhaps all. Therefore, it should only be used when it is known to be safe; for example, any domain point beyond the global escape distance is considered safe.

Operation:

The two components are called in sequence, as shown in the diagram of FIG. 26.

FIG. 27: Traditional Decomposition Interval Embodiment

FIG. 27: The Traditional Decomposition Interval Embodiment uses traditional derivatives to set the size of a decomposition interval surrounding an iterated point. Self winding and winding digit adjustments are not available for this degenerate form.

Inputs:

Point Iterate Data: this is discussed in the prior patent, but is simply a specification of the known iteration data, such as the starting domain point.

Point Iterate Goal: this is discussed in the prior patent, but is merely the goal to determine when to stop iterating. Typically, the precision escape distance is used.

Decomposition Sizing Expressions: Refer to decomposition interval quantifier (574), below.

Outputs:

Decomposition quantified interval: this interval is proportioned to the points surrounding decomposition region so that later processing can disambiguate (resolve) the correct field band integer.

The interval typically includes the domain point, the domain size, and the modulo point and size in the codomain. The iteration point need not be at the center of the resulting interval, because the safe distance will be different in each direction.

Components:

Traditional Derivative Iterator (572)

This component iterates a point in the same fashion as performed in the traditional iterator (404), which was described in the OPTIMIZED MODULO EMBODIMENT of FIG. 22. This component also finds the partial derivatives while iterating the point. Standard partial derivatives are calculated numerically using the chain rule and other numerical derivative calculations. As seen in FIG. 27, the component takes the starting point as specified by point iterate data, and typically iterates until the precision escape distance is achieved, according to the point iterate goal parameter. The result is the partial derivatives, including the 0'th derivatives (the function values themselves) of both the real and imaginary functions of the complex variable. Because it is an analytic function, the simplification afforded by the Cauchy-Schwarz equations for partial derivatives for analytic functions can save time in this computation.

Decomposition Interval Quantifier (574)

A decomposition interval quantifier (574) takes the iterate derivatives from the traditional derivative iterator (572) and substitutes them to another parameter, the decomposition sizing expression, in order to estimate the size of a decomposition interval.

The decomposition sizing expression is constructed to estimate a size for a portion of a decomposition region. For example, suppose we wish to know in domain coordinates how far we can extend in both axes (real and imaginary) such that the potential band fraction change is limited to plus or minus 0.5, and the field band fraction is limited to plus or minus 0.2. The Taylor or Maclaurin Series of expansion of the function is constructed for the field band fraction and/or the potential band function. These expressions can be equated to any real value, such as 0.5 or −.5. The problem is that this polynomial equation is given in terms of two variables, a real axis unknown, say x, and an imaginary value, say y. However, these dual variable equations can be easily changed to a single variable using the first derivatives. For example, suppose the first derivatives for the field band are given by dx=a and dy=b, where a and b are numeric constants. These derivatives specify a direction of most rapid increase n the field band in terms of a linear equation in x or y. To solve for x, we can replace the "y" value using y=x*(b/a). And similarly for solving in y, we derive an x substitution. Once the substitutions are made, we can solve for one variable, and derive the other variable from the linear equation.

A good estimate can be made for distances which cause a specific change in the potential band or field band fractions. For more precision, use $2^{nd}$ order partial derivatives in addition to the first order.

Considerations for the Potential Band:

The decomposition sizing expression can utilize the original potential equations (see prior patent application), or the more intuitive continuum expressions discussed in FIG. 19 Modulo Banding Embodiment. Here, in this embodiment, we are concerned with the traditional derivatives.

Note:

Setting decomposition sizing parameters should follow these rules.

Keep the maximum change for the potential banding to about 0.5 so that any point in the resulting interval will never differ by more than 1 from the iterated point's potential band.

Keep the maximum change for the field banding to about 0.2 so that any point in the resulting interval will never differ by more than 0.5 from the iterated point's field band, even if its at a lower or higher iteration count.

Operation:

The two components are called in sequence, as shown in the diagram of FIG. 27.

FIG. 28: Modulo Decomposition Interval Embodiment:

FIG. 28: The Modulo Decomposition Interval Embodiment uses traditional derivatives together with self winding to set the size of a decomposition interval surrounding an iterated point. It is similar to FIG. 27: the Traditional Decomposition Interval Embodiment.

This module is an enhancement of FIG. 27 Traditional Decomposition Interval Embodiment. Although several additional components are used, the final result is the same type of data, but likely representing a larger decomposition quantified interval in the domain.

Inputs:

Point Iterate Data: this is discussed in the prior patent, but is simply a specification of the known iteration data, such as the starting domain point.

Point Iterate Goal: this is discussed in the prior patent, but is merely the goal to determine when to stop iterating. Typically, the precision escape distance is used.

Winding Digit Adjustment: this is a small integer. Refer to FIG. 20, Winding Digit Adjustment Calculator Embodiment for automatic calculation.

Modulo Decomposition Sizing Expression: this is similar to the traditional decomposition sizing expression discussed under FIG. 27, Traditional Decomposition Interval Embodiment. However, in this case, the expression takes into consideration the winding digit adjustment. Note that the winding digit adjustment divides the field band by $2^p$, where p is the power exponent of the dominant expression. This affects all the partial derivatives.

Outputs:

Decomposition quantified interval: this interval is proportioned to the points surrounding decomposition region so that later processing can disambiguate (resolve) the correct field band integer. The interval typically includes the domain point, the domain size, and the modulo point and size within the codomain.

Components:

Traditional Derivative Iterator (572)

This method refers to the traditional iteration method of calculating derivatives. See FIG. 27, Traditional Decomposition Interval Embodiment.

Decomposition Interval Quantifier (574)

This method was described in FIG. 27, Traditional Decomposition Interval Embodiment. Note here that the modulo decomposition sizing expression compensates for the effects of the winding digit adjustment by incorporating the effect of multiplying the field line derivatives by the effect of multiplication by $p^{wda}$ (where wda is the winding digit adjustment, and "p" is the largest integer exponent of the dominate expression).

Modulo Resolver Method (588)

The modulo resolver method replicates either the FIG. 21 Full Modulo Embodiment or FIG. 22, the Optimized Modulo Embodiment.

Modulo Decomposition Modifier (590)

The modulo decomposition modifier (590) takes two parameters: a modulo point and a decomposition quantified interval which was iterated from the same starting point in the domain. The output of the modulo resolver method (590) includes a field band fraction value to replace the field band fraction of the decomposition quantified interval. This new field band fraction is reflected in the resulting decomposition quantified interval which is returned.

Processing:

Processing can proceed as shown in the diagram of FIG. 28. This method works with any winding digit adjustment, including zero. When the winding digit adjustment is zero, then this method produces the same result as FIG. 27 Traditional Decomposition Interval Embodiment.

The question can be asked, if both the output of the decomposition interval quantifier (574) and the modulo decomposition modifier (590) is a decomposition quantified interval, then what is the difference? Of course, the field band integer is usually undefined (although it could be loaded with whatever the modulo point has for a field band integer), it's the field band fraction which is different. The final interval includes the winding count digits which are shifted into the fraction due to the winding digit adjustment.

FIG. 29: Codomain Interval Embodiment

FIG. 29: The Codomain Interval Resolver Embodiment creates a codomain decomposition interval from a decomposition quantified interval and a codomain point.

Inputs:

A decomposition quantified interval: is a decomposition interval representing a small enough portion of a decomposition region that resolving is possible.

Donor Codomain Point: this is the input point which will donate a field band integer in order to resolve the decomposition quantified interval.

Outputs:

A codomain decomposition interval is produced which is a decomposition quantified interval supplemented with a correct field band integer for the iterated point used to create the interval.

Components:

Codomain Point Resolver Embodiment (558)

On the right side of FIG. 29, the component called codomain point resolver embodiment (558) represents the complete embodiment of FIG. 23, Codomain Point Resolver Embodiment.

Codomain Decomposition Constructor (580)

A codomain decomposition constructor (580) converts a decomposition quantified interval into a codomain decomposition interval. A codomain decomposition interval includes complete field band, both integer and fraction, whereas the decomposition quantified interval is missing the field band integer.

A codomain decomposition constructor (580) accepts two inputs, a decomposition quantified interval, and a donor codomain point.

Next, parameters are constructed for calling the codomain point resolver embodiment (558). The donor codomain point is directly passed, in FIG. 29, as the input codomain point. The modulo point is taken from the decomposition quantified interval.

In FIG. 29, the codomain point resolver method (558) computes an output codomain point. The output codomain point includes a field band integer which is applied, as modified by the codomain point resolver embodiment (580), to the decomposition quantified interval to produce the codomain decomposition interval.

Processing:

The codomain decomposition constructor (580) takes parameters and prepares parameters and calls the codomain point resolver embodiment (558) to produce an output codomain point which is used to construct the codomain decomposition interval, the result of this embodiment.

Note:

The output can use the same data structure as the input called the decomposition quantified interval, provided there is a record to contain the field band integer.

Note: in order to donate a field band integer, the donor codomain point must be relatively close (a fraction of the decomposition region in all directions) to produce the correct result; this closeness must be sufficient to disambiguate the correct integer adjustment to choose the correct field band integer. See the "Note" for FIG. 27: TRADITIONAL DECOMPOSITION INTERVAL EMBODIMENT, above, for relative constants.

FIG. 30: Modulo Codomain Interval Constructor Embodiment

FIG. 30 shows the Codomain Interval Constructor Embodiment which constructs a codomain decomposition interval from a donor codomain point and a nearby domain point. Note that the bottom half of diagram represents the embodiment of FIG. 29, Codomain Interval Resolver Embodiment.

Components:

Codomain Point Resolver Embodiment (558)

See FIG. 29, the Codomain Interval Resolver Embodiment, which uses the same component.

Codomain Decomposition Constructor (580)

See FIG. 29, the Codomain Interval Resolver Embodiment, which uses the same component.

Decomposition Interval Method (592)

The decomposition interval method (592) is either the entire embodiment of FIG. 27, the Traditional Decomposition Interval Embodiment, or FIG. 28 Modulo Decomposition Interval Embodiment.

Processing:

The output of the decomposition interval method (592) is a decomposition quantified interval. This result is passed to the codomain decomposition constructor (580). For the processing of the bottom of the diagram, refer to FIG. 29, Codomain Interval Resolver Embodiment.

FIG. 31, FIG. 32: Codomain Chain Embodiment:

FIG. 31 shows the Codomain Chain Embodiment, a method for creating a chain of overlapping (or touching) codomain intervals to cover a path or area.

Input: target chain input: the input is composed of two parts.

Target Area:

The target area may be an area defined by a simple path in the domain or codomain or may a area of interest.

Initial Codomain Interval:

The initial codomain interval specifies the start of the chaining process. The initial codomain interval could also be a zero radius interval as defined by a single codomain point.

Output:

Next Codomain Interval:

During processing, a series of codomain intervals are ejected; each interval touching or overlapping one of the previously ejected intervals.

Components:

Codomain Interval Constructor Embodiment (596)

This component creates a codomain interval using the embodiment of Codomain Interval Constructor Embodiment of FIG. 30.

Codomain Chain Maker (598)

Beginning with the initial codomain interval, the codomain chain maker creates a series of codomain intervals. To create a new interval, parameters are prepared. The center of a previously created interval (or the initial codomain interval) is used as a donor codomain point. A new center point in the domain is proposed and the point iterate data and the point iterate goal parameters are prepared for the codomain interval constructor embodiment (596). The codomain interval method (596) is called, and the new codomain interval is created. If the new codomain interval is acceptable, then it is ejected as part of the sequence, and is called the next codomain interval.

FIG. 32A to FIG. 32E are used to illustrate two strategies which can be employed in the codomain chain maker (598).

FIG. 32A illustrates a periphery chain strategy. From the initial codomain interval a point on the periphery of the interval, a interval periphery point, is chosen that meets the criteria of the target area parameter. Using the codomain interval constructor embodiment (596), a new codomain interval is generated which will always overlap the previous interval because its center point also overlaps. This approach is very effective and is particularly useful when following a pathway or navigating along potentials and field lines.

FIG. 32B to FIG. 32E show partial results when using a strategy called the interval leaping strategy, to minimize the number of generated intervals. This is particularly useful when covering a large area that could generate a million intervals. Here, some of the generated intervals will be rejected, but the overall number of intervals which are utilized is reduced. This strategy is typically used with a binary subdivision of the complex coordinate system. That is, each spatial area is subdivided into 4 quadrants. In such a case, each interval is chosen to be centered in the middle of a subdivision, and when the size of the decomposition interval is calculated, it might not touch an adjacent codomain interval. In such a case, more subdivision is required so that one of the subdivided quadrants is closer to a fully resolved quadrant. For example, if the intervals are centered on the real axis at 2 and 2.1, and each interval has a equivalent radius of 0.55, then they are okay, because they overlap.

One can even imagine a hybrid system (not illustrated), where a periphery point, in common between the known codomain interval and the proposed interval, is used to create a temporary interval, as done in a periphery chain strategy. This temporary interval provides a bridge to eliminate ambiguity of the decomposition intervals.

Paths used as the Target Area:

A series of codomain decomposition intervals is created by following a predetermined path in the domain or using directional derivatives to move in a specified direction.

Open Areas used as the Target Area: for areas, new codomain intervals, inside the target area and touching the target area, are constructed next to any previous codomain interval. Intuitively, think of a forested area bounded by rivers (defining a target) and after a lighting strike creates a fire; the fire expands within the confines of the rivers and proceeds outward from the edge of the fire until the entire area is blackened (turned into codomain intervals).

Processing:

The codomain chain maker (598) is called, and it makes repeated calls upon the codomain interval method to meet the goal covering the target area with intervals.

FIG. 33: Anchored Chain Embodiment

FIG. 33 shows the Generic Anchored Chain Embodiment is a generic method for finding an anchored codomain point and building an interlocking chain. The interval processing technology relates to both this patent application and the prior patent application.

This generic embodiment represents two embodiments from the prior patent, FIG. 7 and FIG. 17.

Input: anchored target input: the input is composed of two parts.

Target Area:

The target area may be an area defined by a simple path in the domain or codomain.

Domain Point:

Specifying a domain point lying that meets criteria for correct self-winding.

Output:

Resolved Interval:

During processing, a series of resolved intervals are ejected; each interval touching or overlapping one of the previously ejected intervals. If the processing utilizes the technology from this patent, then the resolved interval is a codomain interval; for the prior patent, the resolved interval is a WEII. Whatever technology is chosen, the two components described below must use a compatible technology!

Components:

Generic Self Codomain Resolver Method (604)

This method takes a domain point, and without reference to other points or intervals, generates a codomain point, as in one of the following: see FIG. 25, Traditional Self Resolver Embodiment (Prior Art); or, see FIG. 26, Self Codomain Resolver Embodiment. Also, from the previous patent, see the component called the anchor resolver (226) of prior patent under FIG. 7, SAME LEVEL WINDING INTERVAL EMBODIMENT. These are three separate technologies: by choosing one, the following generic component must use a corresponding technology.

Generic Resolving Chain Embodiment (606)

The component is the entire embodiment of FIG. 31, Codomain Chain Embodiment. Note that this same Codomain Chain Embodiment can use one of two technologies: traditional codomain processing, or with winding digit adjustment technology. For details on these two codomain technologies see codomain interval method (596) of FIG. 31, Codomain Chain Embodiment.

When using the technology from the prior patent, then this component could be a representation of FIG. 17, an embodiment called the Winding Chain Embodiment.

Thus there are three possible technologies, just as in the generic self codomain resolver method (604). The technology chosen for this component must match the previous.

Processing:

This embodiment takes a starting point, and a domain point, and determines its codomain value, and then proceeds to build a chain of interlocking intervals. Once the process is started using an anchor, additional intervals can be added at any time to the chain.

FIG. 34: Periphery Pathfinder Embodiment

FIG. 34 shows a Periphery Pathfinder Embodiment finds a path to the outside using periphery points of successive domain intervals.

Input:

Start domain point: this starting point, within the domain, for finding a way out.

Output:

Domain Path:

The domain path consists of chain of domain intervals together with the candidate domain points, as needed.

Components:

Anchor Check (612)

This component, the anchor check (612) checks a domain point to determine if the point is an anchor point. Any point beyond the global escape distance can be used as an anchor, refer to the prior patent for details on calculating the global escape distance.

Decomposition Interval Method (610)

The component determines a domain interval surrounding an unanchored domain point. The term unanchored is used to indicate that the point has failed the anchor test. The generated domain interval should represent a significant fraction of a decomposition region—not too much, and not too little. For example, values in the range of 0.1 to 0.5. However, the most critical aspect of determining an interval is that the interval should not overlap the boundary of the domain.

Two previous embodiments can be used: see FIG. 27, Traditional Decomposition Interval Embodiment, or see FIG. 29, Modulo Decomposition Interval Embodiment.

Periphery Point Finder (614)

This method uses directional derivatives of the traditional potential function for the iterated point used in a decomposition interval to determine a point on the periphery of the decomposition interval which is in the direction of an escape path within the domain, Domain Path Collector (616)

The component collects the generated domain intervals so that upon completion a domain path is created. The component also saves the anchor domain point which terminates the list.

Operation:

A simple program loop is created. Before each iteration a check is made by the anchor check (612) to see if the domain path has escaped to the global escape distance, if so, all prior results, if any, are returned. Otherwise, an interval is first generated by the decomposition interval method (610) and saved using the domain path collector (616). A periphery point on the interval is found by the periphery point finder (614), and is called the candidate domain point. This point is then passed to the anchor check (614) and the process is repeated when the anchor check (612) fails; if the anchor check (612) succeeds, then the candidate domain point becomes the anchor domain point and is added to the domain path using the domain path collector (616).

Alternatives:

This pathfinder could easily be altered to move deeper or closer to the boundary rather than away from the boundary. Or, it could be designed to move in any direction. However, navigation is best performed using codomain intervals, such as by incorporating directional derivatives into the codomain chain maker (598) in covering the target area using the codomain chain embodiment of FIG. 31.

FIG. 35: Jumper Pathfinder Embodiment

FIG. 35 shows a Jumper Pathfinder Embodiment, which beginning with any domain point, no matter how deep inside a chaotic function, finds a path to the outside using periphery points of successive domain intervals.

If one does not have a decomposition interval method (610) as used in FIG. 34 of the Periphery Pathfinder Embodiment, then there may be difficulty finding the right interval size within orders of magnitude. In such cases, an interval size can be chosen, and then the interval size can be changed until one is found that is a reasonable size. This process can be much slower than that of the Periphery Pathfinder Embodiment, where the correct interval size is quickly chosen, because in this embodiment, multiple iterations may be required. However, this embodiment has the advantage that it works with the prior patent application's technology, which doesn't automatically generate the correct interval size.

Input:

Start domain point: this starting point for finding a way out.

Output:

Domain Path:

The domain path consists of chain of domain intervals together with the candidate domain points, as needed.

Components:

Anchor check (612) See FIG. 34, Periphery Pathfinder Embodiment.

Traditional Derivative Iterator (572)

This method refers to the traditional iteration method of calculating derivatives. See FIG. 27, Traditional Decomposition Interval Embodiment.

Periphery point finder (614): See FIG. 34, Periphery Pathfinder Embodiment.

Domain path collector (616): See FIG. 34, Periphery Pathfinder Embodiment.

Cell Categorizer Embodiment (620)

This component is used to verify that a specific domain interval is free of any boundary points by formally using complex interval analysis during iteration. Refer to the prior patent, the embodiment of FIG. 6.

Directional Interval Initializer (622)

This component takes an domain point and its potential derivatives and first determines a direction for the next interval. The directional interval initializer (472) attempts to construct a large domain interval which encloses the domain point and the path in the direction of the step direction. One method is to simply return a very large interval without any concern as to whether it contains or doesn't contain boundary points (that is, no concern about the validity of the domain points). However, if the component can quickly put some type of reasonable limit on the size, then some computation can be avoided. For example, the approximate distance to the nearest boundary point can be made as the absolute value of the traditional potential divided the absolute value of its derivative. This could be used as the radius for the returned interval. Another method could be to use the technology of the decomposition interval embodiment in FIG. 25 to gauge the size of an interval in the specified direction, but in that case, it probably would be better to use the Periphery Pathfinder Embodiment of FIG. 34.

Safe Interval Looper (624)

This component takes a domain interval, called the candidate interval, and tries to validate it using the cell categorizer embodiment (620). If successful, the domain interval is generated. Otherwise, the size of the domain interval is considered to be too large. A new candidate interval is generated and the process is repeated until the candidate interval passes the testing of the cell categorizer embodiment (620).

Processing:

This embodiment performs the function as the Periphery Pathfinder Embodiment of FIG. 34. However, in this case, extra processing is required to find an interval of appropriate size.

FIG. 36: Path Resolver Embodiment

FIG. 36 shows the Path Resolver Embodiment, a method for finding a chain of domain intervals to resolve an arbitrary domain point.

Input:

Start domain point: this starting point for finding a way out.

Output:

Next Resolved Interval:

A series of resolved intervals are ejected one-by-one to obtain a chain of resolved intervals from the start domain point through to the anchor point.

Invalid Domain Point:

When the Start domain point does not iterate to a precision escape distance, then it is considered as an invalid domain point, and the process stops without generating a path.

Components:

Escape Pathfinder Method (630)

This component finds a domain path from the start domain point. Typical embodiments include: the periphery pathfinder embodiment of FIG. 34 or the jumper pathfinder embodiment of FIG. 35.

Generic Anchored Chain Embodiment (608)

This component takes a path in domain space which includes an anchor point. The anchor point is resolved and then the entire chain of domain intervals is resolved. See generic anchored chain embodiment of FIG. 33.

Processing:

This embodiment performs two simple steps to resolve an arbitrary domain point. First a domain path is constructed using an escape pathfinder method (630). Secondly, the domain path, including the final anchor point, is passed to the generic anchored chain embodiment (608) to obtain a series of ejected resolved intervals.

FIG. 37: Buffered Resolver Embodiment

FIG. 37 shows the Buffered Path Resolver Embodiment, a method for finding a chain of domain intervals to resolve an arbitrary domain point and simultaneously saving the resolved intervals.

Input:

Start domain point: this starting point for finding a way out.

Output:

Next Resolved Interval:

A series of resolved intervals are ejected one-by-one to obtain a chain of resolved intervals from the start domain point through to the anchor point.

Invalid Domain Point:

When the Start domain point does not iterate to a precision escape distance, then it is considered as an invalid domain point, and the process stops without generating a path.

Components:

Generic Anchored Chain Embodiment (608)

This component takes a path in domain space which includes an anchor point. The anchor point is resolved and then the entire chain of domain intervals is resolved. See generic anchored chain embodiment of FIG. 33.

In this embodiment, this component is used similarly to that in the previously described embodiment, Path Resolver Embodiment. However, in this case, direct access is also made to the generic resolving chain method (606), as described in the processing, below. Thus, a prior resolved point, generated by extracting a resolved point from a resolved interval found in the resolved interval buffer (634), is used instead of requiring an anchor point for resolving.

Resolved Interval Buffer (634)

This component provides storage for previously resolved intervals. A binary subdivision is typical where each square is subdivided into four equal squares, as needed for intervals.

Buffered Escape Pathfinder Method (632)

This component is almost the same as the previously described escape pathfinder method (630), except that it checks the resolved interval buffer (634) to see if the candidate domain point already belongs to a resolved domain interval. See FIG. 36, Path Resolver Embodiment, for details on the escape pathfinder method (630), Processing:

In the Path Resolver Embodiment, the escape path of domain intervals is constructed until an anchor point is found. Here, in this embodiment, this cumbersome process is terminated early whenever possible. If the start domain point leads to a candidate domain point which is included in a previously resolved interval, then the prior resolved point of the enclosing interval can be passed directly to the generic resolving chain method (606) without requiring the anchor processing of generic self resolving method (604).

FIG. 38: Pixel Center Bitmap Iterator Embodiment

FIG. 38 shows the Pixel Center Bitmap Iterator Embodiment for ensuring that all pixels are assigned a codomain value based on iterating the domain point at the center of a pixel.

Input:

Bitmap Target area: specify an area of the domain with dimensions for a bitmap

Output:

Resolved Point:

A series of resolved points are ejected one-by-one. A resolved point includes the potential banding and field banding (or its equivalent of potential and field lines).

Components:

Generic Point Resolver (638)

This component produces resolved points from a domain point (domain pixel center) and a resolved interval. Incorporating the functionality of the previously described winding digit limiter (560) is optional but recommended: see FIG. 26, Self Codomain Resolver Embodiment.

Decomposition Technology:

If using the advanced self-winding and winding digit adjustment technology of this patent, then the resolved interval is a codomain decomposition region. This requires two steps. First, a modulo point is created from the domain point using the component called the modulo resolver method (588), which is either the FIG. 21 Full Modulo Embodiment, or FIG. 22 Optimized Modulo Embodiment. Then the embodiment of FIG. 23, Codomain Point Resolver Embodiment, is used to find the codomain point.

Complex Interval Analysis of Prior Patent:

When using the complex intervals of the prior patent technology, the embodiment of FIG. 8, Self Winding Resolver Embodiment, is used to find a point with a winding count. Then the potential and field line calculations are made using the methods of the prior patent, or the use of potential banding and field banding within this document. See FIG. 19, Modulo Banding Embodiment.

Buffered Path Resolver Embodiment (636)

This component is the full embodiment of FIG. 37, the Buffered Path Resolver Embodiment.

Bitmap Render Loop (640)

This component, the bitmap render loop (640), iterates through all the pixel centers of the bitmap target area and finds a resolved interval for each by calling the buffered path resolver embodiment (636). The resulting interval is passed with the domain pixel center to the generic point resolver (638), which ejects the resulting point for later processing.

Processing:

The buffered path resolver embodiment (636) receives domain points generated from the center of a pixel (and converted to domain coordinates). Some points may not be valid domain points and the bitmap render loop (640) would designate a non-domain value for the pixel.

FIG. 39: Hybrid Bitmap Iterator Embodiment

FIG. 39 shows the Hybrid Bitmap Iterator Embodiment incorporating two methods for finding pixel values. Two additional components are utilized. In a high-speed computer gaming environment, obtaining complete resolving of all pixel centers may be too expensive. By having a process which looks for domain intervals in the direction of travel, the most important pixels can be quickly resolved.

Input:

Bitmap target area: specify an area of interest in the domain.

Output:

Resolved Point:

A series of resolved points are ejected one-by-one. A resolved point includes the potential banding and field banding (or its equivalent of potential and field lines).

Components: also see components from FIG. 38, Pixel Center Bitmap Iterator Embodiment.

Priority Adjacency Chain Method (648)

This component finds domain intervals adjacent to fully resolved intervals, and resolves the new domain intervals using an enhanced Generic resolving chain embodiment (606) described in FIG. 33, Generic Anchored Chain Embodiment. Note that this full embodiment is already incorporated into the buffered path resolver embodiment (636) and need not be replicated.

Here, the priority for finding adjacent intervals is based on areas of high interest. For example, in traveling deeper (toward a boundary), the most important intervals are the intervals in front of the direction of travel. Directional derivatives and actual banding data can determine which adjacent intervals will soon be encountered and are not yet resolved; these are given priority. In a limited amount of time (such as it is in a gaming situation), this type of processing is critical.

Suppose the memory for storing resolved intervals is a simple binary subdivision of the domain coordinates. The level of detail of the final pixel resolution determines the smallest size domain interval which is useful. Further subdivision provides insignificantly more detail.

Memory Focus Manager (646)

The memory focus manager is used to oversee the best use of memory for the subdivision of resolved intervals which are created and saved in the buffered escape pathfinder method (632). Intervals outside the target area can be deleted from memory to make way for additional resolved intervals which are needed for the target area. Also, if two resolved intervals represent a small enough area at the same escape iteration count, then they can be coalesced into a single interval to save memory.

Buffered Escape Pathfinder Method (632)

This component is enhanced to allow direct access by the priority adjacency chain method (648). Additional access is needed to find prioritized intervals adjacent to resolved intervals and to update adjacent intervals when they are resolved by the priority adjacency chain method (648). Also, access hooks are required that allow an external component (such as the memory focus manager (646)), to purge resolved intervals.

Processing:

In a gaming environment, the adjacency method of resolving intervals would typically run in high priority, and when it completes, the pixel center algorithm would take over to finish any detail within the given amount of time.

FIG. 40: Automatic Transformer Embodiment

FIG. 40 shows the Automatic Transformer Embodiment which is used to automatically orient and scale a view of the iterated function. The derivatives of an iterated domain point, called the key domain point, are used to automatically generate a viewport transformation.

Input:

Key domain point: specify an point in the domain. For example, in a computer game, the key domain point might be the location of the game user within the domain.

Output:

Transformation:

An output specification (such as a 3×3 transformation matrix) for defining a mapping between the domain and pixel coordinates.

Components:

Traditional Derivative Iterator (572)

This method refers to the traditional iteration method of calculating derivatives. See FIG. 27, Traditional Decomposition Interval Embodiment. Alternatively the derivatives can be calculated using the self winding and the winding digit adjustment so that the full banding data is known.

Orientation Adjuster (652)

This component determines a rotation of the coordinate system appropriate to artistic taste or maximum gaming pleasure. For example, if the gamer is in a moving "spaceship" located at the key domain point, then the rotation is such to always show the view as would be seen from looking from the spaceship in the direction of movement. This is very simple when the movement is taken in the domain coordinate system. However, if the direction of movement is in the codomain, such as traveling along a specific field line, then directional derivatives can be taken and used for the Sin and Cosine of the rotation matrix.

Automatic Zoomer (658)

This component is used to automatically set the scaling factor, so that, the open domain area surrounding the key domain point, is aesthetically proportioned. One simple method is to use the classic technology of estimating the distance to the boundary (i.e. the open domain area) by dividing the classic potential value by the absolute value of its derivative. This gives the domain distance. Then the zoom's scaling factor is set so that this distance is set to some fraction of the overall domain coordinates which are visible in the graphics viewport for the display or printing. For example, if the estimated distance to the boundary is given as 0.0001, then the scaling is set so that a dimension of 0.001 in domain coordinates is mapped to fit the bitmap dimension. In this case, the amount of open space surrounding the key domain point will be approximately 1/10 of the dimensions of the bitmap image.

Another more elaborate approach is to use the decomposition interval method (610) as described in FIG. 34, which would allow setting the viewport based on the geometry of the most immediate area.

Operation:

Once a key domain point is specified, it is iterated by using the traditional derivative iterator (572). The directional derivatives are used to set the rotation using the orientation adjuster (652). The derivatives are also used to set a predetermined or aesthetic scaling factor using the automatic zoomer (658). Finally, the key point itself is used to setup the proper translation.

FIG. 41: Generic Visualizer Embodiment

FIG. 41 shows the Generic Visualizer Embodiment: which automatically transforms and draws a full bitmap image with viewport transformation determined automatically.

Input:

Key domain point: specify an area of the domain.

Output:

Bitmap Image:

This is a bitmap image containing the results of all pixel processing.

Components:

Automatic Transform Embodiment (660)

This method refers to the entire embodiment of FIG. 40, Automatic Transformer Embodiment.

Viewport Target Selector (659)

This component uses a transformation to build a bitmap target area parameter.

Generic Bitmap Iterator (662)

This component is any bitmap iterator which produces iterated point data for the an iterated function. For example, it could be a traditional iteration without field banding, or the more advanced embodiments of FIG. 38 Pixel Center Bitmap Iterator Embodiment, or FIG. 39, Hybrid Bitmap Iterator Embodiment. The resulting values are output for later processing.

Pixel Processor (664)

This component takes the resolved points, and based on the potential and field values, converts the values to pixels. In particular, the double coordinate system can be used for texture mapping and surface modeling.

Operation:

A key domain point is specified. For example, this value may originate from a user's mouse click or be automatically generated during a movie imaging process which automatically navigates a predetermined codomain path. This single input can then be used to generate a transformation using the automatic transform embodiment (660). Based on the windowing system or printer system, the viewport target selector (659) sets up the coordinate transformation between the domain and the pixel bitmap target area. The generic bitmap iterator (662) generates points, typically including both potential and field line data and derivatives. Finally, the pixel processor transforms the iterated data into pixel values for display or printing.

CONCLUSION, RAMIFICATIONS, AND SCOPE

The emphasis of this document is on establishing the core technology for high-speed processing of field line data for the purpose of analyzing and visualizing iterated functions. Three core technologies were discussed for reliably finding field line values: self winding complex interval processing from the prior patent application, called the Optimal Interval Method; the method using self winding and winding digit adjustments with decomposition regions, called the Adjusted Decomposition Region Method; and, the degenerate method of decomposition regions where the winding digit adjustment is zero, called the Decomposition Region Method. For those who wish to avoid building large buffers of domain intervals, there are also the simpler forms of iterating only a single point using self-winding to obtain a modulo point, or possibly a codomain point: this method is called the Self Method.

How do these compare in terms of robustness, complexity, and performance?

Technology Methods:

Optimal Interval Method:

The interval method is best implemented using optimal complex, or metacomplex, intervals. Optimal intervals are probably essential because other interval methods, although faster, rapidly increase in size so that they are probably unusable. However, the small amount of testing indicates that they work reasonably well and generate domain interval sizes that are in the same magnitude as the decomposition intervals. They are also extremely robust and require no fine tuning or estimates. They can be slow because of the many conversions and normalizations, even for basic functions such as complex multiplication. The history of chaos functions also indicates that higher precisions can be very rewarding. However, for complex intervals, this requires writing a lot of code to handle the various high precision functions needed to obtain optimal intervals.

Adjusted Decomposition Method:

The decomposition method produces domain intervals similar in size to the complex intervals. Although no special functions are required, the basic process does require taking derivatives. However, derivatives are typically expressions involving only multiplies and adds, and the costs appear to be far less than the interval method. However, the decomposition method does require some care to make sure that various constants which regulate the size of decomposition quantified intervals are small enough to disambiguate the correct field band. Also, the inherent methods to create derivatives are extremely useful for directional navigation; of course, directional navigation can be done using complex intervals too, but direction navigation not a free side-effect.

Another side-effect of taking derivatives, is that using forms of Taylor series expansions, the values of nearby points and derivatives can be estimated very accurately (depending upon the number of partials taken) so that iterations for nearby points might be able to be eliminated. More work is needed in this area.

Decomposition Region Method:

The traditional decomposition method is simply a degenerate form of the decomposition method which eliminates self-winding and winding digit adjustments. This method can certainly work but a price is paid. Although I have not experimented with this technology, it seems evident that it will have problems. When the precision escape distance is kept very small, such as equal to the global escape distance, then discontinuities will likely appear to separate potential bands. If the precision escape distance is made very large, many intervals will be needed. Thus, it is likely to work, but could be excessively slow. So why use this method when the Adjusted Decomposition Method with the nearly the same simplicity and performance? I think the decomposition region method is not too useful at this time.

Self Method:

When domain intervals are not used, then resolving is usually limited. Consider first the methods of prior art as described earlier. Here, regions can be constructed, but there is no way to differentiate regions at the same potential level. Yet, it does produce a local dual coordinate system as evidenced by the prior art.

However, the prior art does not support self-winding. With a self winding method, the regions can be kept large and continuity exists across potential bands. Even more importantly, the self winding appears to generate codomain points for some Julia sets. I say "appears" because I have performed very limited testing. Other iteration tests, such as on the Mandelbrot, have shown that accurate codomain points, those with correct field band integers, cannot be guaranteed. Of course, self winding always works to generate codomain points when the initial point is beyond the global escape distance.

None-the-less, like many strange algorithmic tricks, the Self Method can generate interesting images.

Higher Dimensions:

All of the above methods should be applicable to higher dimensions, such as the four dimensions for the quaternion number system, a true generalization of complex numbers. Corollaries exist for the real axis and for field lines, but there are three field lines representing the i, j, and k axes. As described in the prior patent application, the optimal complex intervals work exactly the same in higher dimensions. Very likely the decomposition regions also work in the same manner. So, is there any difference in the effectiveness of these methods? I don't know, but it is worth pointing out that the overhead for performing Optimal Interval Method does not significantly increase, but finding derivatives for the Adjusted Decomposition Method would be more difficult.

In one embodiment, a machine executes a modulo banding creator method that returns a modulo banding for a complex escape topology based on predetermined modulo banding parameters of a predetermined last point, a predetermined iteration, a predetermined winding count, a predetermined winding digit adjustment, a predetermined continuum potential commonality function, and a predetermined field line commonality function. A method is provided to create a potential band, comprising: providing a continuum evaluator means to create an unadjusted potential band by applying said predetermined continuum potential commonality function to said predetermined last point and said predetermined iteration count, providing an iteration count differencer means to subtract said predetermined winding digit adjustment from said unadjusted potential band to create an integrated potential band, and providing a floor fraction separator means to produce a potential band comprised of a potential band integer and a potential band fraction by separating said integrated potential band into an integer and a fraction. A method is provided for creating a field band, comprising: providing a method for constructing a principle fraction, comprising: providing an argument extractor means to return a principle angle by taking the complex argument of said predetermined last point, providing a angle fractionalizer means to divide said principle angle by two times pi, the mathematical constant, to produce angle between minus one half and plus one half, providing a field modulo maker means to evaluate said predetermined field line commonality function using said principle fraction, said predetermined winding digit adjustment, said predetermined winding count, and said predetermined iteration count, to produce a field band comprised of a field band integer and a field band fraction. The machine executed modulo banding creator method further includes organizing said field band and said potential band into a modulo banding. In one embodiment, said predetermined continuum potential commonality function applies a real logarithm applied to the traditional potential function to create said unadjusted potential band.

I claim:

1. A machine executed modulo banding creator method comprising:
   (A) creating a potential band at least in part by a programmed machine performing:
      (1) using a continuum evaluator to create an unadjusted potential band by applying a predetermined continuum potential commonality function to a predetermined last point and a predetermined iteration count,
      (2) using an iteration count differencer to subtract a predetermined winding digit adjustment from said unadjusted potential band to create an integrated potential band,
      (3) using a floor fraction separator to produce a potential band comprised of a potential band integer and a potential band fraction by separating said integrated potential band into an integer and a fraction,
   (B) creating a field band at least in part by the programmed machine performing:
      (1) constructing a principle fraction at least in part by the programmed machine performing:
         (a) using an argument extractor to return a principle angle by taking a complex argument of said predetermined last point,
         (b) using a angle fractionalizer to divide said principle angle by two times pi, the mathematical constant, to produce a resulting angle between minus one half and plus one half,
      (2) using a field modulo maker to evaluate a predetermined field line commonality function using said principle fraction, said predetermined winding digit adjustment, a predetermined winding count, and said predetermined iteration count, to produce a field band comprised of a field band integer and a field band fraction, (C) organizing, by the programmed machine, said field band and said potential band into a modulo banding, providing, by the programmed machine, the modulo banding for a complex escape topology based on predetermined modulo banding parameters comprising the predetermined last point, the predetermined iteration count, the predetermined winding count, the predetermined winding digit adjustment, the predetermined continuum potential commonality function, and the predetermined field line commonality function.

2. The machine executed modulo banding creator method of claim 1 wherein said predetermined continuum potential commonality function applies a real logarithm to the traditional potential function to create said unadjusted potential band.

3. A programmed machine comprising:

one or more processors;

machine storage that stores instructions for creating a potential band, the stored instructions for creating the potential band comprising a continuum evaluator, an iteration count differencer, and a floor fraction separator;

the one or more processors configured to use the continuum evaluator to create an unadjusted potential band by applying a predetermined continuum potential commonality function to a predetermined last point and a predetermined iteration count;

the one or more processors configured to use the iteration count differencer to subtract a predetermined winding digit adjustment from said unadjusted potential band to create an integrated potential band;

the one or more processors configured to use the floor fraction separator to produce a potential band comprised of a potential band integer and a potential band fraction by separating said integrated potential band into an integer and a fraction;

the machine storage further storing instructions for creating a field band, the stored instructions for creating the field band comprising an argument extractor, an angle fractionalizer, and a field modulo maker;

the one or more processors configured to use the argument extractor and the angle fractionalizer to construct a principle fraction;

the one or more processors configured to use the argument extractor to return a principle angle by taking a complex argument of said predetermined last point, the one or more processors configured to use the angle fractionalizer to divide said principle angle by two times pi, the mathematical constant, to produce a resulting angle between minus one half and plus one half, the one or more processors configured to use the field modulo maker to evaluate a predetermined field line commonality function using said principle fraction, said predetermined winding digit adjustment, a predetermined winding count, and said predetermined iteration count, to produce a field band comprised of a field band integer and a field band fraction, the machine storage further storing instructions, which, when executed by the one or more processors, cause:

organizing said field band and said potential band into a modulo banding, and providing the modulo banding for a complex escape topology based on predetermined modulo banding parameters comprising the predetermined last point, the predetermined iteration count, the predetermined winding count, the predetermined winding digit adjustment, the predetermined continuum potential commonality function, and the predetermined field line commonality function.

4. The programmed machine of claim 3 wherein said predetermined continuum potential commonality function applies a real logarithm to the traditional potential function to create said unadjusted potential band.

* * * * *